(12) United States Patent
Sato et al.

(10) Patent No.: US 7,298,569 B2
(45) Date of Patent: Nov. 20, 2007

(54) MAGNETIC RECORDING MEDIUM AND MAGNETIC RECORDING DEVICE USING THE SAME

(75) Inventors: Junichi Sato, Nara (JP); Hiroshi Fuji, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 256 days.

(21) Appl. No.: 10/679,696

(22) Filed: Oct. 7, 2003

(65) Prior Publication Data

US 2004/0107426 A1 Jun. 3, 2004

(30) Foreign Application Priority Data

Oct. 7, 2002 (JP) ............... 2002-294169
Sep. 30, 2003 (JP) ............... 2003-341421

(51) Int. Cl.
*G11B 5/02* (2006.01)
*G11B 5/82* (2006.01)

(52) U.S. Cl. ............... 360/59; 360/59; 428/836
(58) Field of Classification Search ............... 360/59, 360/135; 369/13.4, 283, 272, 288; 428/141, 428/142, 332; 720/618
See application file for complete search history.

(56) References Cited

U.S. PATENT DOCUMENTS

| | | | | |
|---|---|---|---|---|
| 4,688,130 A | * | 8/1987 | Nakanouchi et al. | 360/135 |
| 4,734,810 A | * | 3/1988 | Nakayama et al. | 360/131 |
| 5,093,173 A | * | 3/1992 | Nakagawa et al. | 428/846.9 |
| 5,656,385 A | | 8/1997 | Nakajima et al. | |
| 5,843,561 A | * | 12/1998 | Uwazumi et al. | 428/141 |
| 5,846,648 A | * | 12/1998 | Chen et al. | 428/332 |
| 5,908,683 A | * | 6/1999 | Suzuki et al. | 428/840.2 |
| 5,914,168 A | * | 6/1999 | Wakamatsu et al. | 428/65.3 |
| 5,939,170 A | * | 8/1999 | Nishimori et al. | 428/141 |
| 5,949,612 A | * | 9/1999 | Gudeman et al. | 360/97.01 |
| 6,017,605 A | * | 1/2000 | Yamazaki et al. | 428/65.3 |

(Continued)

FOREIGN PATENT DOCUMENTS

JP 61-240429 A 10/1986

(Continued)

OTHER PUBLICATIONS

Ozaki et al, "TbFeCo as a Perpendicular Magnetic Recording Material", Journal of the Magnetics Society of Japan, vol. 25, No. 3-2, 2001, pp. 322-327.

(Continued)

*Primary Examiner*—Andrea Wellington
*Assistant Examiner*—Dismery Mercedes
(74) *Attorney, Agent, or Firm*—Nixon & Vanderhye P.C.

(57) ABSTRACT

A magnetic recording medium includes: an underlayer constituted of at least a substrate and a nonmagnetic metal element; and an amorphous magnetic layer, made of amorphous magnetic material, which magnetically records information. In certain example embodiments, the amorphous magnetic layer has bumps on a surface thereof or the magnetic recording medium has bumps on a surface thereof (surface of a lubricating layer) so that density of the bumps is not less than 400 bumps/μm² or so that height of the bumps is not less than 2% with respect to an average layer thickness of the amorphous magnetic layer. Thus, magnetic wall movement of the amorphous magnetic layer is effectively suppressed, so that it is possible to stably form a recording bit.

20 Claims, 10 Drawing Sheets

U.S. PATENT DOCUMENTS

| | | | |
|---|---|---|---|
| 6,096,445 A * | 8/2000 | Terakado et al. | 428/694 T |
| 6,153,284 A * | 11/2000 | Gui et al. | 428/141 |
| 6,183,892 B1 * | 2/2001 | Saiki et al. | 428/846.3 |
| 6,203,884 B1 * | 3/2001 | Sato et al. | 428/141 |
| 6,303,205 B1 * | 10/2001 | Tanaka et al. | 428/65.3 |
| 6,372,367 B1 * | 4/2002 | Matsuda et al. | 428/831.2 |
| 6,472,049 B2 * | 10/2002 | Song et al. | 428/141 |
| 6,519,114 B1 * | 2/2003 | Wang et al. | 360/135 |
| 6,753,064 B1 * | 6/2004 | Nakama et al. | 428/156 |
| 6,804,822 B2 * | 10/2004 | Sato et al. | 720/718 |
| 6,819,531 B2 * | 11/2004 | Shiroishi | 360/317 |
| 2002/0060979 A1 * | 5/2002 | Tsukuda et al. | 369/275.4 |
| 2002/0081461 A1 * | 6/2002 | Nishikawa et al. | 428/694 TR |
| 2002/0186506 A1 | 12/2002 | Sato et al. | |
| 2003/0157373 A1 * | 8/2003 | Kirino et al. | 428/694 DE |
| 2004/0120062 A1 * | 6/2004 | Yip et al. | 360/48 |

FOREIGN PATENT DOCUMENTS

| | | |
|---|---|---|
| JP | 5-282648 A | 10/1993 |
| JP | 07-192260 | 7/1995 |
| JP | 08-263836 | 10/1996 |
| JP | 2000-207722 | 7/2000 |
| JP | 2002-83417 A | 3/2002 |

OTHER PUBLICATIONS

Katayama et al, "Effect of Underlayers of Laser-Assisted Magnetic Recording Media on High-Density Recording", American Institute of Physics, Applied Physics Letters, vol. 81, No. 26, Dec. 23, 2002, pp. 4994-4996.

* cited by examiner 100 nm 100 nm 100 nm 100 nm

TRACK DIRECTION

4: MAGNETIC LAYER (TbFeCo)
21: COMPOUND
3: UNDERLAYER (Al)

4: MAGNETIC LAYER (TbFeCo)
22: DIFFUSION AREA
103: UNDERLAYER (Ag)

MAGNETIC RECORDING MEDIUM AND MAGNETIC RECORDING DEVICE USING THE SAME

FIELD OF THE INVENTION

The present invention relates to (i) a magnetic recording medium preferably used in a magnetic recording device which magnetically records information by heating a recording region of a magnetic layer with a light beam (heat source) and by applying a magnetic field to the recording region, and to (ii) the magnetic recording device using the magnetic recording medium.

BACKGROUND OF THE INVENTION

Recently, (i) an optical memory represented by Blu-ray Disk (BD) or an optical magnetic disk and (ii) a magnetic memory represented by a hard disk have been drastically modified in a high-density manner. As one of high-density magnetic recording/reproduction techniques, a thermal assist magnetic recording/reproduction system has been being developed. For example, U.S. Pat. No. 5,656,385 registered on Aug. 12, 1997 (corresponding to Japanese Unexamined Patent Publication No. 176034/1992 (Tokukaihei 4-176034): hereinafter, referred to as Patent Document 1) discloses (i) a magnetic recording medium in which there is formed a magnetic layer made of N-shaped ferrimagnetic material whose compensational point (magnetically compensational temperature) is substantially a room temperature and (ii) a thermal assist magnetic recording/reproduction system, using the magnetic recording medium, which is based on emission of a laser beam (hereinafter, this technique is referred to as a first background art).

In such thermal assist magnetic recording/reproduction system, a laser beam heats a recording region of the magnetic recording medium so as to sufficiently reduce its coercive force, and a recording magnetic head applies an external magnetic field to the recording region while the coercive force is being kept low, thereby storing information. In this case, a recording bit is formed only at a region in which a laser beam emission region and a magnetic field application region overlap with each other. That is, as apparent from FIG. 11 showing a relationship between them, (i) a magnetic field application region 111 to which the magnetic field is applied by the magnetic head and (ii) a heated region (corresponding to a light spot) 112 to which the light beam is emitted overlap with each other, and thus overlapping portion becomes a recording region 113. On the recording region 113, a recording bit 114 is formed. As a result, it is possible to record a narrow track 115, having the same width as a beam spot diameter (diameter of the heated region 112: not more than 0.5 μm) of the laser beam, on the magnetic recording medium, while using a recording magnetic head whose width is several μm as in a conventional technique.

Further, also in performing reproduction, the laser beam heats the reproduction region of the magnetic recording medium so as to enhance strength of residual magnetization, and a reproduction magnetic head reads information from the reproduction region while keeping the strength of the residual magnetization enhanced. In this case, the reproduction region is formed only at a region in which the laser emission region and a reproduction head region overlap with each other. As a result, it is possible to reproduce a track recorded at a narrow track pitch while suppressing crosstalk.

In this manner, the thermal assist magnetic recording/reproduction system (first background art) is characterized in that: a laser beam (heat source) is used to selectively heat a region narrower than the magnetic field application region, so that a recording track width is made smaller and crosstalk is reduced, thereby realizing the high-density recording/reproduction.

Further, in the thermal assist magnetic recording/reproduction system, the magnetic recording medium is such that: an underlayer is not provided, or an aluminium nitride (AlN) film whose thickness is 60 nm is formed on a disk substrate as an underlayer, and a magnetic layer and a protective layer are formed in this order. The AlN underlayer is provided so as to prevent light reflection and improve heating efficiency. That is, the AlN underlayer is used to improve an absorptance (ratio at which light is absorbed by the magnetic layer) of light which is incident on the magnetic recording medium, thereby improving recording sensitivity.

Further, Japanese Unexamined Patent Publication No. 282648/1993 (Tokukaihei 5-282648)(Publication date: Oct., 29, 1993: hereinafter, referred to as Patent Document 2) recites such magnetic recording medium that: an underlayer made of alloy is formed between a substrate and a magnetic layer in accordance with a sputtering process, and a wavy portion (bumps) is formed on a surface of the recording medium (hereinafter, referred to as a second background art). Further, Patent Document 2 also recites that it is preferable to use an alloy, such as $In_{95}Zn_5$ (melting point is 143.5° C.), $Al_{2.2}Sn_{97.8}$, $Mg_9Sn_{91}$, $In_{52}Sn_{48}$, and $Bi_{47.3}In_{52.7}$, whose melting point is less than 350° C. An object of the technique recited in Patent Document 2 is to improve a magnetic property of the magnetic recording medium, but its main object is to prevent the magnetic recording medium from being absorbed by the magnetic head by providing a wavy portion on a surface of the magnetic recording medium at low cost (see [PROBLEMS TO BE SOLVED BY THE INVENTION] of Patent Document 2).

Note that, US-2002-018650-A1 published on Dec. 12, 2002 (after the priority date of the present application) (corresponding to Japanese Unexamined Patent Publication No. 16636/2003 (Tokukai 2003-16636): hereinafter, referred to as Patent Document 3) recites a magnetic recording medium which includes: a substrate; a magnetic layer for magnetically storing information; and an underlayer having bumps on its surface on the side of the magnetic layer, wherein the underlayer is made of nonmagnetic metal element, and a diameter of the bump is less than 100 nm.

In the magnetic recording medium, as a shortest recording bit length (length in a track direction of a recording bit of a minimum unit corresponding to information of 1 bit: corresponding to M shown in FIG. 11) is made shorter by raising a recording frequency (frequency of magnetic field application in a case of a magnetic field modulation system), it is possible to realize the higher-density recording.

However, in the thermal assist magnetic recording system recited in Patent Document 1, the performance of the magnetic recording medium is so insufficient that it is difficult to form a recording bit whose shortest recording bit length is not more than 200 nm, so that there is limit in improving the recording density.

This is based on the following fact: as a result of evaluating the recording and reproduction of the magnetic recording medium used in Patent Document 1, when the shortest recording bit length dropped below 200 nm, signal quality was rapidly deteriorated. Moreover, as a result of observing the recording bit formed on the magnetic recording medium by means of a magnetic force microscope (MFM), when the shortest recording bit length dropped below 200 nm, recording bits were deranged, for example, the recording bits were positioned close together, and some of the recording bits disappeared, and the track width became narrower so that the track disappeared. Thus, in the conventional magnetic recording medium, an actually usable shortest recording bit length was at most 250 nm in terms of reliability of the thermal assist magnetic recording device.

A cause of the unstable condition of the recording bits may be an exchange interaction force. As the recording bit is smaller, the exchange interaction force has more influence among forces which influence the recording bit. In a case where the magnetic layer is made of the N-typed ferrimagnetic material, such as a TbFeCo magnetic material, whose compensational point is substantially a room temperature, the exchange interaction force aligns magnetization directions of recording bits adjacent to each other into the same direction. Particularly, in the thermal assist recording/reproduction system in which the recording region is heated, magnetic anisotropy (coercive force) of the recording/reproduction region drops in recording information, so that the exchange interaction force has large influence. Thus, in forming the recording bit, peripheral magnetization has large influence, so that a magnetic wall easily moves. This may result in the aforementioned phenomenon. In order to stably form the recording bit whose shortest recording bit length is not more than 200 nm, it is necessary to suppress the magnetic wall movement, for example, it is necessary to provide a pinning site for suppressing the magnetic wall movement.

Particularly, in the magnetic recording medium having a magnetic layer made of amorphous magnetic material, the magnetic wall movement of the magnetic layer tends to occur, so that it is important to suppress the magnetic wall movement of the magnetic layer. That is, in the magnetic recording medium using a polycrystalline magnetic material (for example, a CoCr alloy magnetic material) as the magnetic layer, the recording bits are separated by a crystal grain boundary. On the other hand, in the magnetic recording medium using the magnetic layer made of amorphous magnetic material, the recording bits are not separated by a crystal grain boundary, so that whole the medium has magnetic continuation. Thus, the recording bits greatly exert the exchange interaction forces to each other, and hardly suppress the magnetic wall movement. Therefore, in the case where the magnetic layer is made of amorphous magnetic material, it is more important to suppress the magnetic wall movement of the magnetic layer. Thus, it is necessary to introduce a large amount of pinning sites by providing bumps, each of which is smaller than the recording bit, on the magnetic layer.

The aforementioned Patent Document 2 discloses that an underlayer having an uneven surface (bumps) is used so as to provide an uneven surface (bumps) on a recording medium. However, the second background art does not focus on the suppressing of the magnetic wall movement, but recites a Co-polycrystalline magnetic layer as an example of the magnetic layer. In such polycrystalline magnetic layer, a minute crystal grain boundary exists as described above, so that the magnetic wall movement hardly occurs, and even when the bumps are formed on the surface of the magnetic layer by using the underlayer, it is considered that the bumps hardly suppress the magnetic wall movement.

Further, in the second background art, a main object of forming the uneven surface (bumps) by using the underlayer is to prevent the magnetic recording medium from being absorbed by the magnetic head by forming the bumps on the surface of the magnetic recording medium, so that improvement of the recording density is not considered at all.

SUMMARY OF THE INVENTION

The present invention was conceived in view of the foregoing problems, and its object is to provide (i) a magnetic recording medium by which it is possible to perform high-density recording with sufficient signal quality and (ii) a magnetic recording device using the magnetic recording medium.

In order to solve the foregoing problems, the magnetic recording medium of the present invention includes: a substrate; and a magnetic layer, made of amorphous magnetic material, for magnetically recording information, wherein the magnetic layer has bumps on a surface thereof, and density of the bumps is not less than 400 bumps/$\mu m^2$ (per square micrometer).

According to the arrangement, the magnetic layer has the bumps whose density is not less than 400 bumps/$\mu m^2$ on its surface, so that the number of the minute bumps is so sufficient that the bumps function as a pinning site for suppressing the magnetic wall movement of the magnetic layer, thereby making the movement distance short. Thus, even though the magnetic layer is made of amorphous magnetic material which tends to cause the magnetic wall movement, it is possible to stably form a minute recording bit whose recording bit length is short on the magnetic recording medium. Further, it can be said that the pinning effect is particularly useful in a magnetic recording medium having a magnetic layer made of amorphous magnetic material. Thus, also in a case of performing high-density recording, it is possible to obtain sufficient signal quality.

While, when the density of the bumps is less than 400 bumps/$\mu m^2$, the number of the bumps functioning as the pinning site is so small that it is impossible to obtain the sufficient pinning effect.

Note that, in the present specification, "density of the bumps" means the number of bumps per 1 $\mu m^2$. Further, "density of the bumps" is a value calculated as an inverse number of a value obtained by squaring "diameter of the bump" (described later). That is, for example, when the diameter of the bump is 50 nm, the density of the bumps is 400 bumps/$\mu m^2$, and when the diameter of the bump is 10 nm, the density of the bumps is 10000 bumps/$\mu m^2$. Thus, in the present specification, "the density of the bumps is not less than 400 bumps/$\mu m^2$" means "the diameter of the bump is not more than 50 nm".

Further, in the present specification, "diameter of the bump" means a value obtained by calculating an average pitch in the bumps, that is, a value obtained by calculating a distance from a top of the bump to a top of an adjacent bump in a statistical manner, for example, in accordance with power spectrum density (PSD) evaluation (described later) using an image obtained by an atom force microscope (AFM).

Further, in order to solve the foregoing problems, the magnetic recording medium of the present invention includes: a substrate; and a magnetic layer, made of amorphous magnetic material, for magnetically recording information, wherein the magnetic layer has bumps on a surface thereof, and height of the bumps is not less than 2% with respect to an average layer thickness of the magnetic layer.

According to the arrangement, the height of the bumps formed on the surface of the magnetic layer is not less than 2% with respect to the average layer thickness of the magnetic layer, and the height is so sufficient that the bumps function as the pinning site for suppressing the magnetic wall movement of the magnetic layer, so that it is possible to stably form the recording bit even though the recording bit length is short. When the ratio of the bump's height with respect to the average layer thickness of the magnetic layer is less than 2%, the bumps cannot bring about the pinning effect sufficiently.

Note that, in the present specification, "height of the bumps" means a value obtained by averaging heights each of which corresponds to a length from a bottom to a top of the bump whose diameter corresponds to the "diameter of the bump", and the value is obtained from an AFM image in accordance with the following procedure. That is, a plurality of bumps each of which has a diameter corresponding to the "diameter of the bump" are selected from the AFM image, and each distance from the bottom to the top thereof is calculated in accordance with cross sectional view of the bumps, and an average value of thus obtained distances is regarded as the "height of the bumps".

Further, in order to solve the foregoing problems, the magnetic recording medium of the present invention includes: a substrate; and a magnetic layer, made of amorphous magnetic material, for magnetically recording information, wherein the magnetic recording medium has bumps on a side of the magnetic layer, and density of the bumps is not less than 400 bumps/$\mu m^2$. Further, in order to solve the foregoing problems, the magnetic recording medium of the present invention includes: a substrate; and a magnetic layer, made of amorphous magnetic material, for magnetically recording information, wherein the magnetic recording medium has bumps on a side of the magnetic layer, and height of the bumps is not less than 2% with respect to an average layer thickness of the magnetic layer.

Here, in a general magnetic recording medium, a protective layer and a lubricating layer are formed as a layer, made of materials other than the magnetic material, which is formed on the magnetic layer, and these layers have little influence on a shape of the surface of the magnetic recording medium, so that the magnetic recording medium's surface on the side of the magnetic layer has bumps (bumps formed on an outermost layer) whose shape is substantially the same as the bumps formed on the magnetic layer.

Thus, it is general that: the magnetic recording medium which has the bumps on the side of the magnetic layer so that the density thereof is not less than 400 bumps/$\mu m^2$ can bring about the same effect as the magnetic recording medium arranged so that the density of the bumps formed on the surface of the magnetic layer is not less than 400 bumps/$\mu m^2$, that is, also in the case of performing the high-density recording, it is possible to obtain the sufficient signal quality. Further, it is possible to improve a sliding property and a surfacing property.

Likewise, it is general that: the magnetic recording medium which has the bumps on the side of the magnetic layer so that the height thereof is not less than 2% with respect to the average layer thickness can bring about the same effect as in a magnetic recording medium arranged so that the height of the bumps is not less than 2% with respect to the average layer thickness, that is, also in the case of performing the high-density recording, it is possible to obtain the sufficient signal quality. Further, it is possible to improve a sliding property and a surfacing property.

Further, in order to solve the foregoing problems, the magnetic recording device of the present invention is to cause the magnetic layer of the aforementioned magnetic recording medium to magnetically record information, and includes magnetic field application means for applying a magnetic field, which determines a magnetization direction of the magnetic layer, to the magnetic layer.

According to the arrangement, by using the magnetic recording medium having the aforementioned characteristics, it is possible to provide the magnetic recording device which can perform the high-density recording with the sufficient signal quality.

Further, the magnetic recording device of the present invention is to cause the magnetic layer of the aforementioned magnetic recording medium to magnetically record information, and includes: heating means for locally heating the magnetic layer; and magnetic field application means for applying a magnetic field, which determines a magnetization direction of the magnetic layer, to at least one part of a heated region in the magnetic layer.

According to the arrangement, by using the magnetic recording medium having the aforementioned characteristics, it is possible to provide the magnetic recording device which can perform the high-density recording with the sufficient signal quality.

Further, according to the arrangement, a magnetic recording system, in which the magnetic layer is locally heated and the magnetic field application means applies a magnetic field to at least one part of a heated region in the magnetic layer, that is, a so-called thermal assist magnetic recording system is used, so that a region on which information is recorded is formed only at a region in which a light beam emission region and a magnetic field application region overlap with each other. Thus, it is possible to reduce the recording track width, and it is possible to record information in a high-density manner.

Further, in the thermal assist magnetic recording system, a recording region (recording bit) is heated in recording information, so that a coercive force of the magnetic layer drops and magnetic anisotropy of the magnetic layer largely drops. Thus, in the thermal assist recording system, the magnetic wall movement tends to occur, so that it is more important to suppress the magnetic wall movement caused by the bumps formed on the surface of the magnetic layer. As a result, in the thermal assist magnetic recording system, it is possible to further improve the signal quality in causing the bumps formed on the surface of the magnetic recording medium to perform the high-density recording.

For a fuller understanding of the nature and advantages of the invention, reference should be made to the ensuing detailed description taken in conjunction with the accompanying drawings.

DESCRIPTION OF THE EMBODIMENTS

Figure 1:
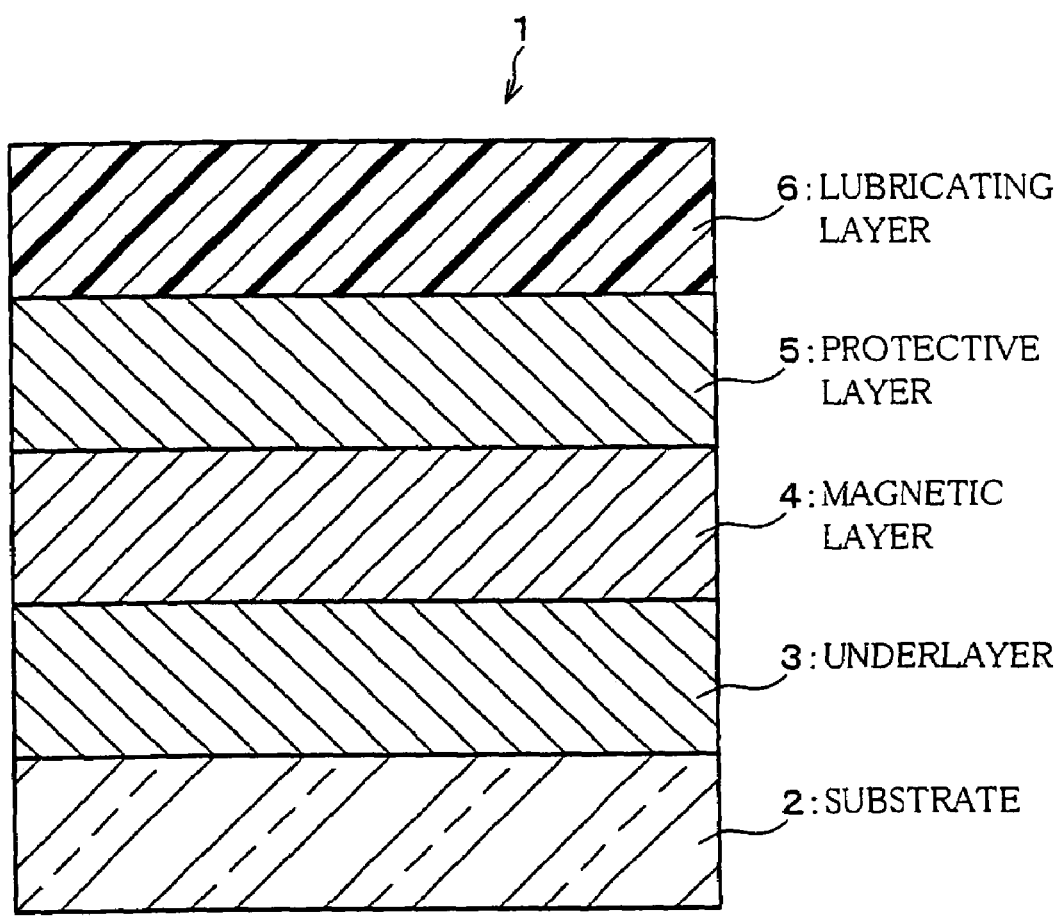
FIG. 1 is a cross sectional view showing a magnetic recording medium according to one embodiment of the present invention.
Figure 2:
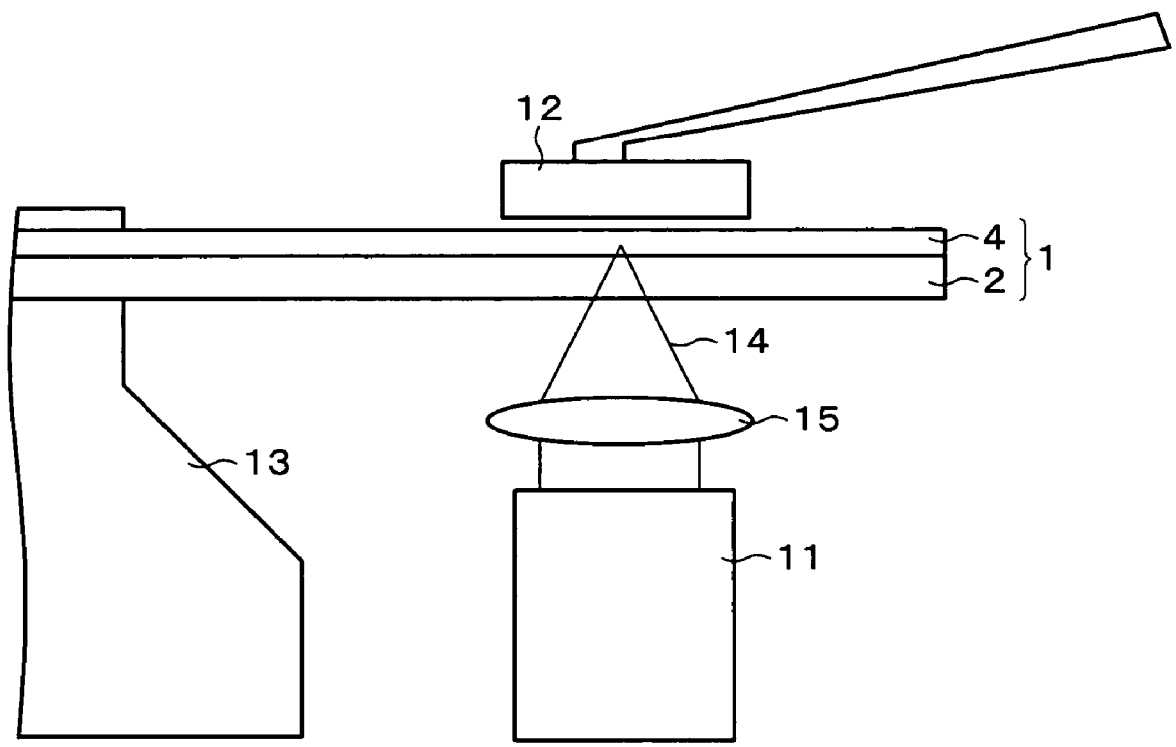
FIG. 2 is a cross sectional view showing a magnetic recording medium according to one embodiment of the present invention.
Figure 11:
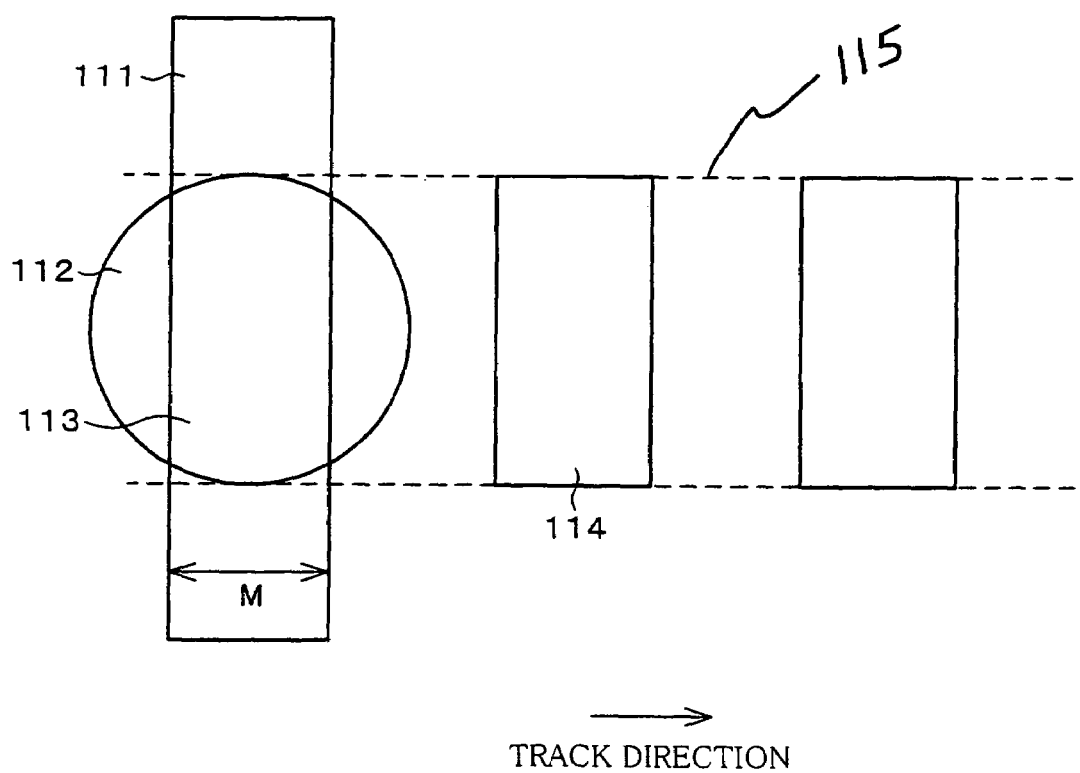
FIG. 11 is a diagram for illustrating how a recording bit is formed in a thermal assist magnetic recording/reproduction system.

The following description will explain one embodiment of the present invention with reference to FIGS. 1, 2, and 11.

A magnetic recording medium according to the present embodiment is a magnetic recording medium used in a thermal assist magnetic recording/reproduction system in which a laser beam heats a recording region so as to magnetically record or reproduce information on or from the recording region.

As shown in FIG. 1, a magnetic recording medium 1 is arranged so that: on and above a substrate 2, there are provided an underlayer 3 made of nonmagnetic metal element, an amorphous magnetic layer (magnetic layer) 4 made of amorphous magnetic material for magnetically storing information by receiving heat and a magnetic field, a protective layer 5, and a lubricating layer 6, all of which are formed in this order. Further, bumps are formed on a surface of the underlayer 3, and the bumps cause other bumps having the same shape to be formed on (i) a surface of the amorphous magnetic layer 4 (surface on the side of the protective layer 5) and (ii) a surface of the magnetic recording medium 1 (surface of the lubricating layer 6). In this manner, the bumps are formed on (i) the surface of the amorphous magnetic layer 4 and (ii) the surface of the magnetic recording medium (surface on the side of the amorphous magnetic layer 4).

A substrate whose surface positioned on the side of the amorphous magnetic layer 4 is substantially flat is used as the substrate 2. For example, it is possible to use a glass substrate, an aluminium (Al) substrate, a plastic substrate, and a silicon substrate, and the like, but it is particularly preferable to use the glass substrate. It is preferable to set an average roughness (Ra) of the substrate 2 to not more than 1 nm so that the bumps formed on the amorphous magnetic layer 4 are made conspicuous. However, the less the value is, the more preferable it is.

Further, the underlayer 3 is used to form the bumps on a surface of the amorphous magnetic layer 4 that is to be formed on the underlayer 3. It is preferable that the underlayer 3 is made of nonmagnetic metal element whose melting point is not more than 900° C., and it is more preferable that the underlayer 3 is made of nonmagnetic metal element whose melting point is not more than 700° C. Examples of the nonmagnetic metal element whose melting point is relatively low include aluminum (Al: melting point is 660° C.), Al alloy (when Al is mainly contained, it is general that its melting point approximately ranges from 480° C. to 640° C.), zinc (melting point is 420° C.) and alloy thereof, and magnesium (melting point is 649° C.) and alloy thereof. For example, a film of Al is formed on the substrate 2 so that its average film thickness ranges from 1 to 6 nm, thereby forming the bumps on the surface of the amorphous magnetic layer 4. Note that, when nonmagnetic metal element such as silver (melting point is 962° C.) and copper (melting point is 1083° C.) is used as the underlayer 3, its melting point is too high to form the bumps on the surface of the amorphous magnetic layer 4, so that it is not preferable to use such nonmagnetic metal element.

While, the underlayer 3 is in contact with the amorphous magnetic layer 4 which is heated by the laser beam, so that temperature of the underlayer 3 tends to be raised. Thus, it is preferable that the underlayer 3 has sufficient heat resistance so that its shape is not varied by raised temperature. Therefore, it is preferable that the underlayer 3 is made of nonmagnetic metal element whose melting point is not less than 400° C., and it is more preferable that the underlayer 3 is made of nonmagnetic metal element whose melting point is not less than 600° C. As the nonmagnetic metal element used as a material for the underlayer 3, it is not preferable to use, for example, bismuth (melting point is 271° C.), tin (melting point is 232° C.), indium (melting point is 157° C.), gallium (melting point is 30° C.), and an alloy made mainly of these metals (for example, $Al_{2.2}Sn_{97.8}$ whose melting point is 228.3° C., $Mg_9Sn_{91}$ whose melting point is 200° C., $In_{95}Zn_5$ whose melting point is 143.5° C., $In_{52}Sn_{48}$ whose melting point is 117° C., $Bi_{47.3}In_{52.7}$ whose melting point is 109.5° C.) and the like, since they are inferior in the heat resistance.

The amorphous magnetic layer 4 has a function for storing information by forming a recording bit. The bumps are provided on the surface of the amorphous magnetic layer 4 as described above, so that the bumps function as a pinning site in suppressing the magnetic wall movement. As a result, it is possible to stably form a recording bit whose recording bit length is short.

As the amorphous magnetic material constituting the amorphous magnetic layer 4, a magnetic material which allows thermal assist recording, that is, an amorphous ferrimagnetic material whose compensation temperature approximates a room temperature is used, but it is preferable to use an amorphous rare earth-transition metal alloy. Examples of the amorphous rare earth-transition metal alloy include TbFe, GdFe, DyFeCo, TbFeCo, and the like, but it is particularly preferable to use TbFeCo. Note that, in the present specification, notation of alloy such as "TbFe" represents not an alloy having a specific composition ratio but an alloy having an arbitrary composition ratio. Further, in order to obtain a pinning effect from a TbFeCo film, it is preferable to form the TbFeCo film after forming an Al underlayer on the substrate 2.

The protective layer 5 protects the amorphous magnetic layer 4 from being damaged in contacting the magnetic head. A material for the protective layer 5 is not particularly limited, but it is preferable to use a carbonaceous protective layer such as a carbon layer and a carbon nitride layer. Among of them, it is particularly preferable to use the carbon layer.

The lubricating layer 6 reduces friction in contacting the magnetic head. As the lubricating layer 6, it is preferable to use fluorinated lubricant, and it is particularly preferable to use perfluoropolyoxyalkane (perfluoropolyether) lubricant.

Further, in the magnetic recording medium 1 according to the present embodiment, the bumps are formed on the surface of the amorphous magnetic layer 4 provided on the underlayer 3 so that their density is not less than 400 bumps/$\mu m^2$.

Thus, on the surface of the amorphous magnetic layer 4, a large amount of bumps exist in the recording bit corresponding to information of 1 bit, so that the bumps formed on the surface of the amorphous magnetic layer 4 exhibit sufficient effect as a pinning site. As a result, it is possible to effectively suppress the magnetic wall movement, so that it is possible to record high-density information on the amorphous magnetic layer 4 with sufficient signal quality. The magnetic recording medium 1 according to the present embodiment is a recording medium for thermal assist recording/reproduction, and its magnetic layer is made of amorphous magnetic material, so that it is more important to suppress the magnetic wall movement of the magnetic layer, and the bumps formed on the surface of the magnetic layer 4 more effectively prevent the magnetic wall movement of the magnetic layer.

Further, in order that the bumps formed on the surface of the amorphous magnetic layer 4 exhibit larger effect as the pinning site, it is preferable to provide as many bumps as possible in a recording bit corresponding to information of 1 bit, so that it is more preferable that density of the bumps formed on the surface of the amorphous magnetic layer 4 is not less than 800 bumps/$\mu m^2$, and it is still more preferable that density of the bumps formed on the surface of the amorphous magnetic layer 4 is not less than 2500 bumps/$\mu m^2$. It is most preferable that density of the bumps formed on the surface of the amorphous magnetic layer 4 is 2500 bumps/$\mu m^2$ to 10000 bumps/$\mu m^2$.

Further, as to size of the bumps formed on the surface of the amorphous magnetic layer 4, it is preferable that at least a diameter of the bump is smaller than a track width (width in a track direction of the recording bit corresponding to information of 1 bit) of the recording bit, and it is more preferable that the diameter is not more than half of the track width. For example, when the track width is 100 nm, it is preferable to set the diameter of the bump to less than 100 nm, and it is more preferable to set the diameter of the bump to not more than 50 nm. Thus, it is preferable to set the diameter of the bump to not more than 50 nm, and it is more preferable to set the diameter of the bump to 10 to 50 nm. Further, by forming such minute bumps on the surface of the amorphous magnetic layer 4, the magnetic wall movement is suppressed, so that it is possible to stably form a recording bit whose shortest recording bit length is small without transforming a shape of the magnetic bit unnecessarily. Thus, the amorphous magnetic layer 4 can record high-density information with sufficient signal quality.

Further, an experiment performed in Example described later shows that: in order that the bumps formed on the surface of the amorphous magnetic layer 4 exhibit sufficient effect as the pinning site, when a distance from a bottom to a top of the bump is regarded as "height of the bumps", it is preferable to set the height to not less than 2% with respect to a thickness of the amorphous magnetic layer 4. Thus, it is preferable that the height of the bumps formed on the surface of the amorphous magnetic layer 4 is not less than 2% with respect to a thickness of the amorphous magnetic layer 4. For example, in a case where the thickness of the amorphous magnetic layer 4 is 50 nm, it is preferable to set the height of the bumps formed on the surface of the amorphous magnetic layer 4 to not less than 1 nm, thereby effectively suppressing the magnetic wall movement. Further, in order to effectively suppress the magnetic wall movement, it is more preferable to set the height of the bumps to not less than 5% with respect to the thickness of the amorphous magnetic layer 4. Further, it is preferable to set the height of the bumps to not less than 1 nm. As described above, by setting the height of the bumps formed on the surface of the amorphous magnetic layer 4 to be sufficiently high, it is possible to effectively suppress the magnetic wall movement, so that the amorphous magnetic layer 4 can record high-density information with sufficient signal quality.

Note that, the foregoing description explained the magnetic recording medium 1 in which the bumps are formed on the surface of the amorphous magnetic layer 4 on the underlayer 3 so that their density is 400 bumps/$\mu m^2$. However, when the height of the bumps formed on the surface of the amorphous magnetic layer 4 is not less than 2% with respect to the thickness of the amorphous magnetic layer 4 or the height is not less than 1 nm, it may be so arranged that the bumps are formed on the surface of the amorphous magnetic layer 4 so that their density is less than 400 bumps/$\mu m^2$. Also in this arrangement, the height of the bumps formed on the surface of the amorphous magnetic layer 4 is made sufficiently high, so that it is possible to effectively suppress the magnetic wall movement.

Further, the foregoing description explained the magnetic recording medium 1 as a recording medium based on the thermal assist magnetic recording system. However, the magnetic recording medium 1 can be used as a magnetic recording medium based on other system, for example, the magnetic recording medium can be used as a magnetic recording medium which records information based only on application of a magnetic field. In the case of the magnetic recording medium which records information based only on application of a magnetic field, it is more preferable to set the diameter of the bump to not more than 20 nm (density of the bumps is not less than 2500 bumps/$\mu m^2$) so as to prevent such a problem that a magnetic property of the magnetic recording medium shows in-plane anisotropy which results in thermal fluctuation. It is much more preferable to set the diameter of the bump to 10 to 20 nm (density of the bumps is not less than 500 bumps/$\mu m^2$ to 10000 bumps/$\mu m^2$).

Further, the magnetic recording medium 1 includes the protective layer 5 and the lubricating layer 6 on and above the amorphous magnetic layer 4. However, the arrangement is not limited to this, but the magnetic recording medium may include either the protective layer 5 or the lubricating layer 6, or the magnetic recording medium may include neither the protective layer 5 nor the lubricating layer 6. In this manner, the magnetic recording medium in which the protective layer 5 and/or the lubricating layer 6 are/is omitted can be arranged so that a gap between the magnetic head and the magnetic recording medium is narrowed. Thus, such magnetic recording medium is expected as a medium which can realize high-density recording.

Further, in the aforementioned magnetic recording medium 1, the bumps are formed on its surface (surface of the lubricating layer 6) as in the surface of the amorphous magnetic layer 4. However, as long as the density and the height of the bumps are set to the aforementioned values in forming the bumps on the surface of the amorphous magnetic layer 4, a shape of the surface of the magnetic recording medium is not particularly limited. Thus, for example, it may be so arranged that: the surface of the protective layer 5 or the lubricating layer 6 that is formed on or above the amorphous magnetic layer 4 of the magnetic recording medium 1 is processed so as to omit the bumps formed on the surface of the magnetic recording medium 1.

Further, it may be so arranged that: a shape of the bumps formed on the surface of the magnetic recording medium 1 is transformed so as to be different from a shape of the bumps formed on the surface of the amorphous magnetic layer 4. In this case, it is preferable to form the bumps on the amorphous magnetic layer 4 so that the density and/or the height thereof are set to be the aforementioned values. Thus, it is possible to improve the sliding property and the surfacing property. In the magnetic recording medium processed so that the shape of the bumps formed on the surface of the protective layer 5 or the lubricating layer 6 is different from the shape of the bumps formed on the surface of the amorphous magnetic layer 4 (for example, the shape of the bumps formed on the surface of the protective layer 5 or the lubricating layer 6 is made smoother than the shape of the bumps formed on the surface of the amorphous magnetic layer 4), it is possible to improve the sliding property and the surfacing property. That is, by processing the surface of the protective layer 5 or the lubricating layer 6, it is possible to design the shape of the bumps formed on the surface of the amorphous magnetic layer 4 and the shape of the bumps formed on the surface of the magnetic recording medium 1 so as to achieve their objects respectively (the former is to improve the recording density, and the latter is to improve the sliding property and the surfacing property).

Note that, in forming the bumps on the amorphous magnetic layer 4, other than the formation of the underlayer 3, it may be arranged so that: the surface of the amorphous magnetic layer is directly processed in accordance with a lithography process.

Next, the following description will explain one embodiment of a magnetic recording/reproduction device (magnetic recording device) using the aforementioned magnetic recording medium.

As shown in FIG. 2, the magnetic recording/reproduction device of the present embodiment includes a laser pickup for thermal assist (heating means, heater) 11, a magnetic head (magnetic field application means, magnetic field generator) 12, a spindle (main body) 13 for rotating the magnetic recording medium 1, and an object lens 15.

The laser pickup 11 has a laser light source (not shown). The laser light source emits a light beam (laser beam) 14 for locally heating the amorphous magnetic layer 4 from the side of the substrate 2 of the magnetic recording medium 1 through the underlayer 3 to the amorphous magnetic layer 4. The object glass 15 collects the light beam 14 emitted from the laser light source to the amorphous magnetic layer 4.

The magnetic head 12 is disposed opposite to the laser pickup 11 with the magnetic recording medium therebetween. The magnetic head 12 applies a magnetic field for determining a magnetizing direction of the amorphous magnetic layer 4 to at least a part of a light emission region of the amorphous magnetic layer 4.

Next, the following description will explain a process of magnetically storing information on the magnetic recording medium 1 in accordance with the thermal assist recording system using the magnetic recording/reproduction device. In this process, information is recorded in accordance with a magnetic field modulation system. However, the process is not limited to this, but the magnetic recording medium 1 can record information in accordance with an optical modulation system.

First, the laser pickup 11 and the magnetic head 12 are positioned so as to correspond to each other, so that the light emission region and the magnetic field application region correspond to each other. Thereafter, a magnetization direction of the amorphous magnetic layer 4 is fixed in accordance with direct current (DC) erase. That is, the magnetization direction of the amorphous magnetic layer 4 is initialized.

Next, at the same time as application of the magnetic field that is performed by the magnetic head 12, the light beam 14 heats the amorphous magnetic layer 4, thereby determining a magnetization direction of each region of the amorphous magnetic field 4 in accordance with information to be recorded.

That is, the light beam 14 emitted from the laser light source provided in the laser pickup 11 is collected to a desired recording portion of the amorphous magnetic layer 4 provided in the magnetic recording medium 1 as shown in FIG. 2, and a temperature of the recording portion to which the light beam 14 is emitted is raised to such a temperature that a coercive force of the recording portion is sufficiently small (approximately 1 kOe). Further, a signal magnetic field obtained by modulating information to be recorded is applied to the magnetic head 12, so as to record the information on the recording portion. In this case, only a portion in which the coercive force is reduced to approximately 1 kOe records the information. Next, the emission of the light beam 14 is stopped so that the temperature of the recording portion drops, thereby completing the recording operation.

In this manner, as shown in FIG. 11, a magnetic field application region 111 to which the magnetic field is applied by the magnetic head 12 and a heated region (corresponding to a light spot) 112 heated by the laser emission overlap with each other, and thus overlapping portion becomes a recording region 113, and the recording bit 114 is formed in the recording region 113.

Note that, in the thermal assist magnetic recording system, the light beam (laser light) 14 is emitted from the side of the substrate 2 of the magnetic recording medium 1 through the underlayer 3 to the amorphous magnetic layer 4, so that it is preferable that the underlayer 3 is so thin that it allows a sufficient amount of laser light to be transmitted, more specifically, it is preferable that a thickness of the underlayer 3 is not more than 100 nm, and it is more preferable that the thickness is not more than 10 nm. Note that, in the case of emitting the light beam 14 from the side of the lubricating layer 5 of FIG. 1 to the magnetic recording medium 1, even when the thickness of the underlayer 3 is more than 100 nm, the laser light is not shielded.

Next, the following description will explain a process of reproducing the magnetic recording medium 1 used in the magnetic recording/reproduction device.

First, the light beam 14 is emitted from the laser light source provided in the laser pickup 11 to a reproduction portion of the amorphous magnetic layer 4. Thus, temperature of the reproduction portion to which the light beam 14 is emitted is raised, and the residual magnetization of the reproduction portion is accordingly raised. In this case, it is preferable to heat the reproduction portion to such a temperature that the residual magnetization is maximized. Note that, at this time, the residual magnetization which occurs from a portion which does not receive the light beam 14 is small. This is because the portion which does not receive the light beam 14 is kept at a room temperature.

Further, the magnetic head 12 detects leakage flux which leaks from the reproduction portion whose residual magnetization has become large. Next, the emission of the light beam 14 that is performed with respect to the reproduction portion is stopped so that the temperature of the reproduction portion drops, thereby completing the reproduction operation.

Note that, as a magnetic recording device which causes the magnetic recording medium according to the present invention to record information, the present embodiment explained the magnetic recording device which records information by causing the magnetic head to apply a magnetic field and by causing a laser beam to heat the recording medium. However, the process of causing the magnetic recording medium according to the present invention to record information is not limited to this, but it is possible to use a magnetic recording device which records information only by causing the magnetic head to apply a magnetic field. However, in order to suppress deterioration of a signal-to-noise ratio (S/N ratio) that is caused by thermal fluctuation brought about in performing high-density recording, it is preferable to record information in accordance with the so-called thermal assist magnetic recording system in which heating and magnetic field application are combined with each other. Further, the present invention can be applied to an optical magnetic recording medium or an optical recording device which reproduces a signal in accordance with a magnetic optical effect.

The following Examples and Comparative Examples will further detail the present invention, but the present invention is not limited to them.

Note that, in the present specification, "average layer thickness" represents a film thickness that is indirectly calculated as follows. That is, first, the same material as a material constituting a film to be measured is used to form a sample film, which is so thick that bumps on a surface of the film are not conspicuous, under the same condition as in formation of the film to be measured. Next, a thickness of the sample film is measured, and a film formation rate (thickness of a film formed in each unit time) is calculated from (i) a value of the film thickness that has been measured and (ii) a film formation time which is a time taken to form the film. Then, based on the film formation rate, a film thickness (average layer thickness) of the film (layer) to be measured is calculated from the film formation time of the film to be measured. It can be considered that the average layer thickness is obtained by converting a mass of the layer into a layer thickness according to its density.

The average film thickness of an aluminium film was calculated as follows. First, the aluminium film was formed for 25 minutes under a predetermined condition. Thereafter, a film thickness of the aluminium film was calculated by means of a minute difference measuring instrument. As a result, the film thickness was 70 nm. Thus, an average film formation rate of the aluminium film was calculated. As a result of the calculation, the average film formation rate was 2.8 nm in every minute. Further, under the same condition as the aforementioned condition, the aluminium film was formed in various film formation times, and the film formation time is multiplied by the film formation rate (2.8 nm in every minute), thereby obtaining the average film thickness.

EXAMPLE 1

The following description will explain a process of manufacturing a magnetic recording medium as an example.

First, an aluminium film (hereinafter, referred to as "Al underlayer") which functioned as the underlayer 3 was formed on a glass disk substrate which functioned as the substrate 2 so that its average film thickness was 3.7 nm. The aluminium film was formed in accordance with a direct current magnetron sputtering process at a sputtering pressure of 0.5 Pa.

Next, a TbFeCo film was formed on a surface of the Al underlayer as the amorphous magnetic layer 4 so that its film thickness was 50 nm. The TbFeCo film was formed in accordance with a direct current magnetron sputtering process at a sputtering pressure of 0.45 Pa. Note that, the TbFeCo film was formed by using an alloy made of Tb23 atomic % (hereinafter, referred to "at %"), Fe60 at %, and Co17 at % as a target in sputtering. Thus formed TbFeCo film was such that: its magnetic compensation point (compensation temperature) was approximately 50° C. and its Curie temperature was approximately 250° C.

Next, an amorphous carbon (a-C) film (C-protective layer) which was used in a general hard disk was formed on the TbFeCo film as the protective layer 5 so that its average film thickness was 10 nm. The amorphous carbon film was formed in accordance with a direct current magnetron sputtering process at a sputtering pressure of 1.0 Pa.

Lastly, perfluoropolyoxyalkane lubricant was applied to a surface of the amorphous carbon film as the lubricating layer 6 by using a dip coater, thereby forming a lubricant film whose film thickness was 0.8 nm.

COMPARATIVE EXAMPLE 1

For comparison, a magnetic recording medium having a conventional structure in which the underlayer 3 was not provided was manufactured. In order to exactly evaluate the effect of the bumps formed on the surface of the magnetic recording medium, the magnetic recording medium having no underlayer 3 was manufactured in the same manner as in the magnetic recording medium of Example 1 except that a step of forming the Al underlayer as the underlayer 3 was omitted. Thus, the magnetic recording medium of Comparative Example 1 was arranged in the same manner as in the magnetic recording medium of Example 1 except that the Al underlayer was not provided.

COMPARATIVE EXAMPLE 2

For comparison, a magnetic recording medium which included an underlayer, having bumps other than the Al underlayer, as the underlayer 3 was manufactured. At this time, an Ag film was used as the underlayer 3. In order to exactly evaluate the effect of the different material of the underlayer, the magnetic recording medium having the foregoing structure was manufactured in the same manner as in the magnetic recording medium of Example 1 except that a step of forming the Ag film was performed instead of performing the step of forming the Al underlayer as the underlayer 3. Note that, an average film thickness of the Ag film was 2.5 nm. Thus, the magnetic recording medium of Comparative Example 2 was arranged in the same manner as in the magnetic recording medium except that the Ag film whose average film thickness was 2.5 nm was provided instead of the Al underlayer whose average film thickness was 3.7 nm as the underlayer 3.

EXAMPLE 2

Next, surfaces of magnetic layers of the magnetic recording media of Example 1, Comparative Example 1, and Comparative Example 2 were observed from normal direction thereof by means of an atom force microscope (AFM). Micrograms of Example 1, Comparative Example 1, and Comparative Example 2 are respectively shown in FIG. 3, FIG. 4, and FIG. 5.

In order to observe the surface of the magnetic layer of each of the magnetic recording media of Example 1, Comparative Example 1, and Comparative Example 2, the protective layer 5 and the lubricating layer 6 were omitted from each magnetic recording medium so that its outermost surface was the amorphous magnetic layer 4, thereby obtaining samples. That is, the sample of Example 1 was obtained by providing the aluminium film (underlayer 3) and the TbFeCo film (amorphous magnetic layer 4) on and above the glass disk substrate (substrate 2), and the sample of Comparative Example 1 was obtained by providing the TbFeCo film on the glass disk substrate, and the sample of Comparative Example 2 was obtained by providing the Ag film and the TbFeCo film on and above the glass disk.

Figure 3:
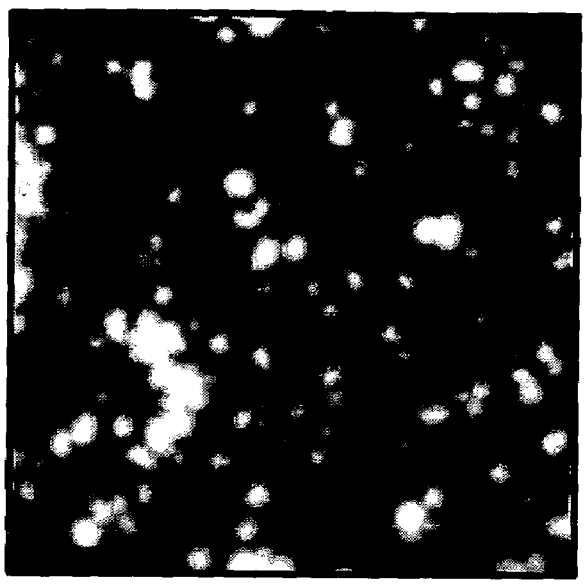
FIG. 3 shows a surface of an amorphous magnetic layer of the magnetic recording medium according to Example of the present invention that is observed from its normal line direction by means of an atomic force microscope.

As shown in FIG. 3, in the magnetic layer of the magnetic recording medium of Example 1 in which the Al film was formed as the underlayer 3, minute bumps (diameter of each bump was approximately 30 nm) formed on its surface in a high-density manner were observed.

Figure 4:
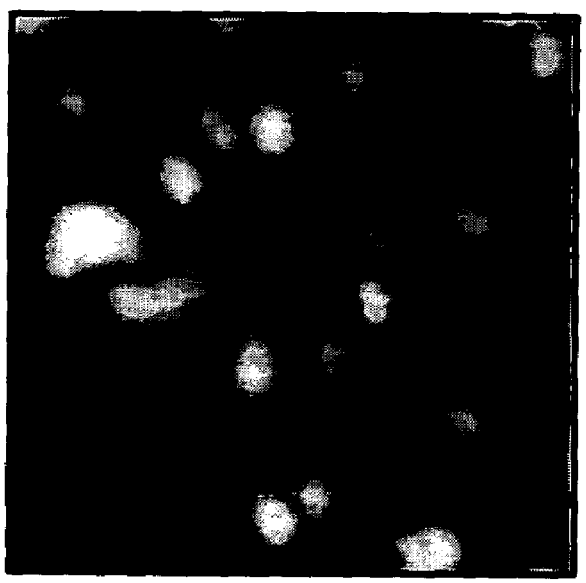
FIG. 4 shows a surface of an amorphous magnetic layer of a magnetic recording medium of Comparative Example that is observed from its normal line direction by means of the atomic force microscope.

While, as shown in FIG. 4, in the surface of the magnetic layer of the magnetic recording medium of Comparative Example 1 in which the underlayer was not provided, the bumps were observed, but a diameter of each bump was not less than 100 nm, and its density was low.

Figure 5:
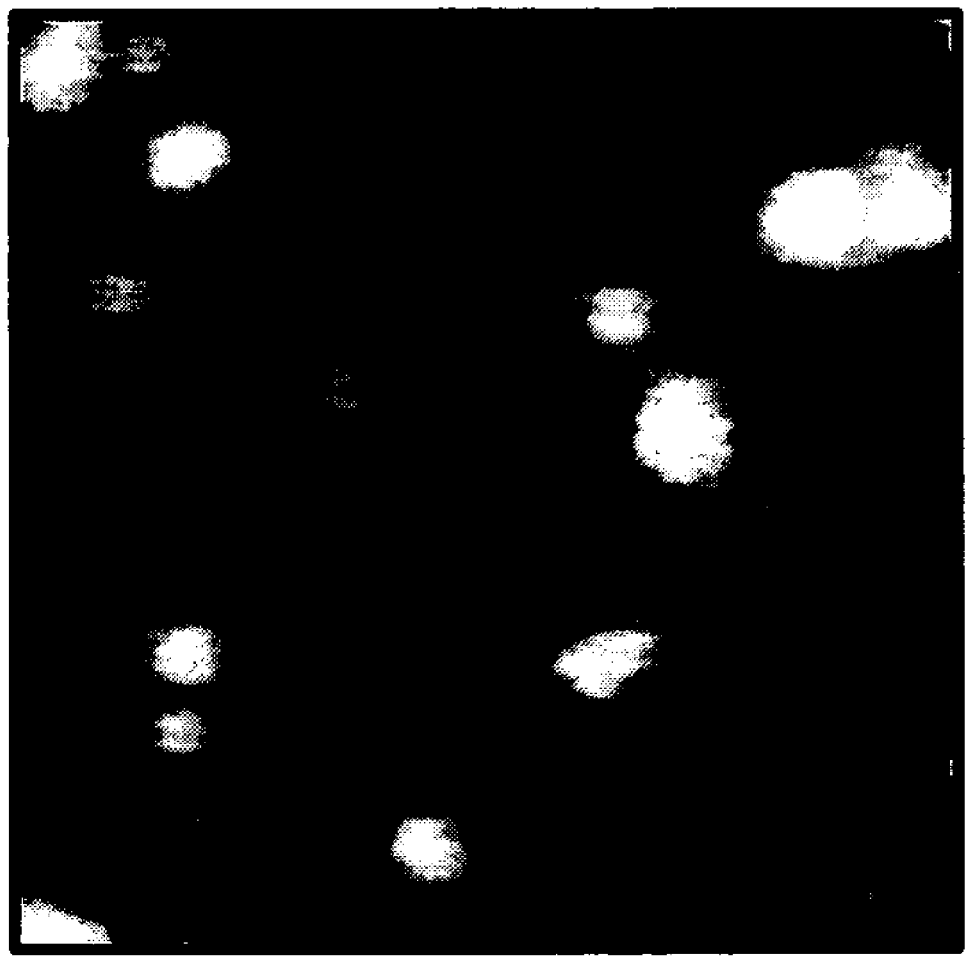
FIG. 5 shows a surface of an amorphous magnetic layer of a magnetic recording medium of Comparative Example that is observed from its normal line direction by means of the atomic force microscope.

Further, as shown in FIG. 5, in the surface of the magnetic layer of the magnetic recording medium of Comparative Example 2 in which the Ag film was provided as the underlayer 3, the minute bumps were not observed. Thus, it is considered that: when the layer thickness of the magnetic layer is 50 nm, the minute bumps do not appear on the surface of the magnetic layer even though the Ag film is provided, so that the pinning effect is small.

EXAMPLE 3

Next, surface shapes of the magnetic recording media manufactured in Example 1 and Comparative Example 1 were observed by means of an atom force microscope (AFM).

Figure 6:
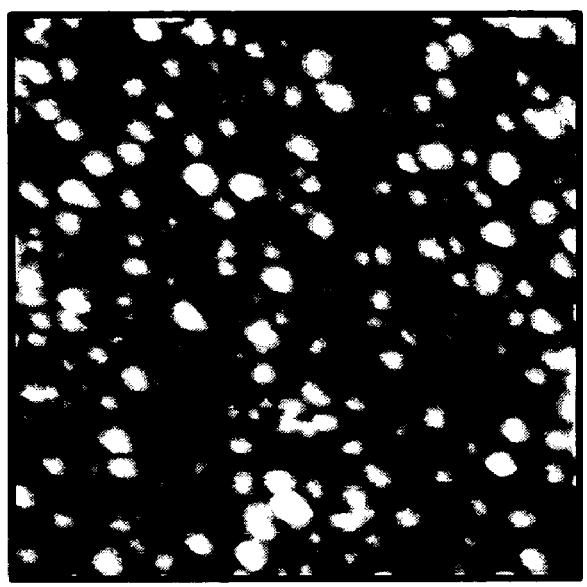
FIG. 6 shows a surface of the magnetic recording medium according to Example of the present invention that is observed from its normal line direction by means of the atomic force microscope.
Figure 7:
FIG. 7 shows a surface of an amorphous magnetic layer of a magnetic recording medium of Comparative Example that is observed from its normal line direction by means of the atomic force microscope.

The surfaces of the magnetic recording media of Example 1 and Comparative Example 1, that is, the surfaces of the lubricating layers 6 were observed from its normal direction by means of the atom force microscope, and the observed surfaces are respectively shown in FIG. 6 and FIG. 7.

As shown in FIG. 6, in the surface of the magnetic recording medium of Example 1 in which the Al film was provided as the underlayer 3, minute bumps (diameter of each bump was approximately 30 nm) formed on the surface in a high-density manner were observed. Further, at this time, the height of bumps (length from a bottom to a top of the bump) was approximately 4 nm. Here, the layer thickness of the magnetic layer 4 was 50 nm, so that the height of bumps corresponds to 8% with respect to the layer thickness of the magnetic layer.

On the other hand, as shown in FIG. 7, in the surface of the magnetic recording medium of Comparative Example 1 in which the underlayer was not provided, the bumps were observed, but a diameter of each bump was not less than 100 nm, and its density was low. Thus, it is considered that: there is little pinning effect which suppress the magnetic wall movement.

The surface shapes of the magnetic layers shown in FIG. 3 and FIG. 4 are substantially the same as the surface shapes of the magnetic recording media shown in FIG. 6 and FIG. 7. This is based on the following reason: the thickness of each of the protective layer 5 and the lubricating layer 6 is approximately 10 nm, so that a shape of the TbFeCo film causes the same shape to be formed on the surface of the magnetic recording medium via the protection film. That is, it was confirmed that: the surface shape of the magnetic recording medium is substantially the same as the shape of the bumps formed on the surface of the magnetic layer.

Further, in order to statistically measure the diameter of the bump formed on the surface of each of the magnetic recording media manufactured in Example 1, Comparative Example 1, and Comparative Example 2, power spectrum density (PSD) evaluation was performed with respect to the AFM images (corresponding to FIG. 6 and FIG. 7) obtained by observing the surfaces by means of the atom force microscope (AFM).

Figure 8:
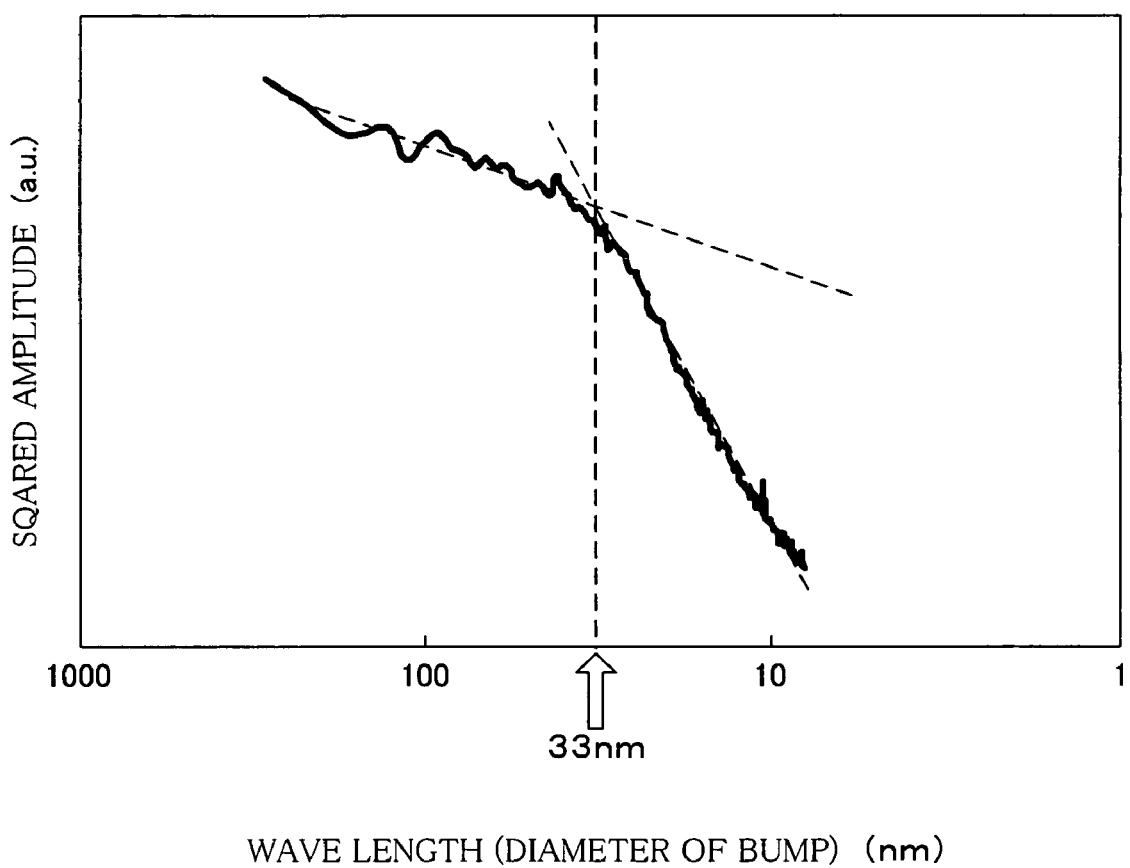
FIG. 8 shows a PSD curve obtained by performing calculation with respect to the surface of the magnetic recording medium according to Example of the present invention.

The PSD evaluation is a statistical technique for analyzing a waveform distribution of a signal by analyzing power spectrum which is generated by dividing power of the signal at every frequency band (frequency division) and representing the power of each frequency band as a main function. In the PSD evaluation of Example 3, there was generated a signal, obtained by means of the atom force microscope (AFM), which indicates a shape of the bumps appearing in the AFM observation image (the signal's waveform corresponds to the shape of the bumps, and the signal's amplitude corresponds to the height of bumps, and the signal's wavelength corresponds to the diameter of the bump), and the signal's amplitude was subjected to the frequency division, thereby obtaining the power spectrum. Then, the power spectrum is indicated by a curved line (PSD curve) obtained by plotting (i) its wavelength (i.e., the diameter of the bump) as a horizontal axis and (ii) squared value of signal's amplitude (amplitude of the bumps, i.e., the height of the bumps) as a vertical axis in a graph. FIG. 8 is the graph showing the PSD curve obtained by calculating the foregoing values from the AFM observation image of the surface of the magnetic recording medium of Example 1 and by plotting the calculated values.

The PSD curve of FIG. 8 drops monotonously as the wavelength is shorter. In the PSD curve of FIG. 8, there is an inflection point P in a certain wavelength. That is, a ratio of (i) the wavelength and (ii) the amplitude of the bumps largely changes after passing the inflection point P. More specifically, the amplitude of the bumps largely decreases with respect to the wavelength after passing the inflection point P. This means that: a large number of fabrications (bumps) exist on the surface of the magnetic recording medium have diameters, each of which corresponds to the wavelength of the inflection point P. In this case, the diameter of the bump corresponding to the wavelength of the inflection point P is approximately 33 nm, so that the PDS curve of FIG. 8 shows that the diameter of the bump existing on the surface of the magnetic recording medium of Example 1 is approximately 33 nm.

The "inflection point P" is an intersecting point of (i) a line obtained by performing linear approximation on the side of a low frequency of the PSD curve and (ii) a line obtained by performing linear approximation on the side of a high frequency of the PSD curve (FIG. 8 shows a position of the "inflection point P".

Thus, it is possible to make such an estimate that the diameter of the bump on the surface of the magnetic recording medium having the Al underlayer shown in FIG. 3 is 3 nm. Compared with the observed surface shape shown in FIG. 6, it is apparent that the estimation exactly indicates the grain diameter of the minute bump existing on the surface shown in FIG. 6.

Thus, in the bumps formed on the surface of the magnetic recording medium 1 having the Al underlayer shown in FIG. 3, the diameter of the bump was 33 nm, and the density of the bumps was 920 bumps/$\mu m^2$.

While, when the bumps are not formed on the surface of the magnetic recording medium, the inflection point P does not occur in the PSD curve. In the AFM observation images of (i) the magnetic recording medium, manufactured in Comparative Example 2, which has the Ag underlayer and (ii) the magnetic recording medium, manufactured in Comparative Example 1, which has no underlayer, there was no distinct peak, and distinct bumps were not observed also in the AFM image. Also in the recording/reproduction evaluation, the frequency property was not distinctively improved.

Thus, it was proved that: by using the Al film as the underlayer 3, it is possible to easily form the bums on the surface of the TbFeCo film.

Note that, it is possible to calculate the density of the bumps (diameter of the bump) by counting the number of the bumps existing in a predetermined area in accordance with the actual AFM image. When it is difficult to perform the exact linear approximation with respect to the PSD curve, it is possible to calculate the density in accordance with the foregoing technique. For example, the number of the bumps is actually counted from FIG. 3, and thus calculated values are as follows: the density of the bumps is 200 bumps÷0.25 $\mu m^2$=800 bumps/$\mu m^2$, and the average grain diameter is $(0.25 \ \mu m^2 \div 200 \ \text{bumps})^{1/2} \approx 0.35$ nm, so that thus calculated values substantially correspond to the values calculated from the intersecting point of the frequencies that have been subjected to the linear approximation in the PSD curve.

Further, there were manufactured six types of magnetic recording media obtained by changing the height of the bumps of the Al film of the magnetic recording medium of Example 1 to 1 nm, 2 nm, 3 nm, 4 nm, 5 nm, and 6 nm, and the foregoing observation was performed with respect to them. As a result of the observation, in a case where the layer thickness of the TbFeCo film was 50 nm, when the height of the bumps was not less than 1 nm, this arrangement exhibited the effect of suppressing (pinning) the magnetic wall movement. That is, it was proved that: when the height of the bump formed on the magnetic layer was not less than 2% with respect to the layer thickness of the magnetic layer, this arrangement exhibited the great pinning effect. Thus, it is considered that this arrangement enables the recording density to be improved.

Note that, the height of the bumps was measured by visually observing the AFM image.

EXAMPLE 4

Next, information was actually recorded and reproduced on and from (i) the magnetic recording medium manufactured in Example 1 and (ii) the magnetic recording medium manufactured in Comparative Example 1 by using a thermal assist magnetic recording/reproduction device for evaluation. Particularly, relationship of recording frequency properties which indicates whether information is recorded in high-density manner or not was checked in detail. Further, a shape of the formed recording bit was observed by means of a magnetic force microscope (MFM).

As the thermal assist magnetic recording/reproduction device for evaluation, the magnetic recording/reproduction device having the aforementioned arrangement of FIG. 2 was used. Further, the laser pickup 11 having the laser light source whose oscillation wavelength was 650 nm was used, and the object lens 15 whose numerical aperture (NA) was 0.65 was used, so as to collect the laser beam. As the magnetic head 12, a member obtained by integrally combining a GMR (Giant Magneto Resistive) element with a thin film induction type magnetic head was used. Further, a surfacing amount of the magnetic head 12 was approximately 28 nm. A rotation number of the spindle 13 (rotation number of the magnetic recording medium 1) was 3600 rpm. At this time, a linear velocity of the magnetic recording medium 1 was 11.2 m/sec.

In this evaluation experiment, first, direct current (DC) erase was performed, and information was magnetically recorded on the basis of the thermal assist. Thereafter, reproduction was performed on the basis of the thermal assist, thereby measuring a magnetic recording/reproduction property. A condition under which the direct current erase was performed was such that: output (laser power) of the laser light source was 5 mW, and a magnetic field current of the magnetic head 12 (head magnetic field current) was 20 mA. Further, a condition under which information was magnetically recorded on the basis of the thermal assist was such that: the output of the laser light source was 5 mW, and the magnetic field current to the magnetic head 12 was 10 mA. Further, a condition under which the reproduction was performed on the basis of the thermal assist was such that: the output of the laser light source was 2 mW, and a bias current of the GMR element was 5 mA.

The present inventors calculated the recording frequency property as an index of high-density recording of the magnetic recording medium, i.e., variation of a signal quality in a case where a frequency in applying the magnetic field (recording frequency) was varied.

Further, in the present evaluation experiment, a carrier wave signal level (C-level) and a noise level (N-level), in the case where the recording frequency was varied, were measured, and a ratio thereof, i.e., a carrier-to-noise ratio (C/N) was calculated as a parameter for evaluating the signal quality of the recording bit. Thus obtained measurement result (recording frequency property) is shown in FIG. 9.

Figure 9:
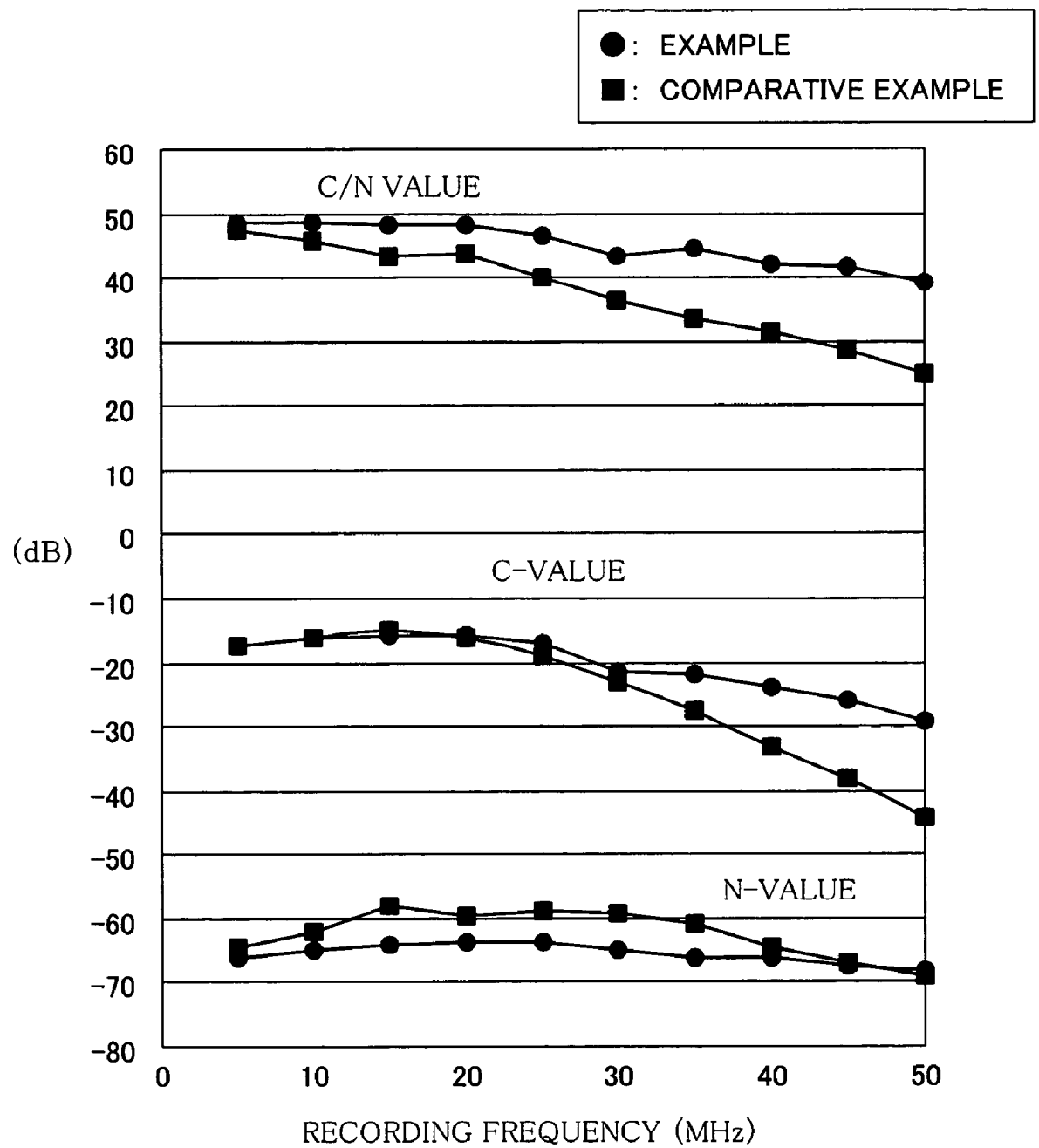
FIG. 9 is a graph showing recording frequency properties of the magnetic recording media of Example and Comparative Example of the present invention.

A plot shown by ● in FIG. 9 indicates a measurement result of the recording frequency property of the magnetic recording medium 1 of Example 1 in which the Al underlayer is used to form the minute bumps on its surface. It was proved that: in the magnetic recording medium 1 of Example 1, the C/N did not largely decrease (drop) within a range of from 5 MHz to 50 MHz of the recording frequency, and it was possible to keep the C/N at approximately not less than 40 dB. Further, also in observing the magnetic image by means of the magnetic force microscope, it was confirmed that: the track width was neither narrowed nor discontinued within a range of from 5 MHz to 50 MHz of the recording frequency. Thus, it was proved that: according to the magnetic recording medium 1, it was possible to obtain a preferable recording frequency property and a preferable recording property.

Further, size of the magnetic bit recorded at the aforementioned frequency was compared with size of the bump of the magnetic recording medium of Example 1. A result of the comparison was as follows. Since the linear velocity of the magnetic recording medium was 11 m/sec, the length of the magnetic bit was 110 nm at 50 MHz of the recording frequency for example. Thus, when the track width is 1000 nm, the size of the magnetic bit is 110 nm×1000 nm, and an area of the magnetic bit is $1.1 \times 10^5$ nm$^2$ (0.1 μm$^2$). While, in the magnetic recording medium of Example 1, the diameter of the bump (average pitch of the bumps) is 33 nm as described above, so that an average area occupied by a single bump (or a single concave) is 1090 nm$^2$. Thus, in a case where information is recorded on the magnetic recording medium of Example 1 so that the recording frequency is 50 MHz and the track width is 1000 nm, approximately 100 bumps (or 100 concaves) are included in a single magnetic bit of $1.1 \times 10^5$ nm$^2$ (0.11 μm$^2$). At this time, it is possible to realize approximately 40 dB of the C/N, so that it is possible to perform preferable recording and reproduction of information.

Further, when information is recorded by forming a small magnetic bit so that the oscillation wavelength of the laser light source for the thermal assist is 400 nm and the recording frequency is 100 MHz, the length of the magnetic bit is 56 nm, and the track width is 100 nm, and the area of the magnetic bit is 5600 nm$^2$. In the magnetic recording medium of Example 1, the area occupied by a single bump is 1090 nm$^2$ as described above, so that approximately five bumps (or five concaves) are included in a single magnetic bit. At this time, the C/N is 25 dB, so that it is possible to record and reproduce information. Thus, it was proved that: as long as a single magnetic bit included at least five bumps (or five concaves), it was possible to obtain a required minimum C/N. Note that, when 5600 nm$^2$ (area of the magnetic bit) is converted into the density, the magnetic bit density is 115 giga bits per square inch (=one square inch÷5600 nm$^2$; 17.9 giga bits/cm$^2$).

That is, when the density of the bumps is 920 bumps/μm$^2$ like the magnetic recording medium of Example 1, information can be recorded on the magnetic bit whose density is 115 giga bits per square inch in a high-density manner. In order to realize the magnetic bit density of 100 giga bit per square inch (15.5 giga bit/cm$^2$), it is preferable that the density is not less than 800 bumps/μm$^2$.

Further, a plot shown by ■ in FIG. 9 indicates a measurement result of a magnetic frequency property of the magnetic recording medium of Comparative Example 1 in which the underlayer was not used and the minute bumps were not provided on its surface. In this case, the C-level was largely decreased after passing 25 MHz. Moreover, it was possible to keep the C/N not less than approximately 40 dB only in a range of from 5 MHz to 25 MHz of the recording frequency. Further, also in observing the magnetic image, when the recording frequency exceeded 25 MHz, the track width was narrowed, and a phenomenon in which the recording bit was discontinued occurred. These results shows that: when the recording frequency exceeds 25 MHz, existence of the recording bit becomes rapidly unstable, thereby deteriorating the signal quality.

Note that, although not shown, also in the case where an aluminium nitride (AlN) film was used as the underlayer 3, the value substantially approximates the plot shown by ■. Further, in the case of Example 2 in which Ag was used as the underlayer, the value was improved compared with ■ shown in Comparative Example 1, but the value failed to reach ● shown in Example 1.

Further, measurement was performed with respect to the magnetic recording media of Example 1 and Comparative Example 1 by using a sample-vibrating-type magnetization measuring device (VSM). According to the measurement, it was proved that: the coercive force of the magnetic recording medium of Example 1 is 1.5 times stronger than the coercive force of the magnetic recording medium of Comparative Example 1. This shows that: the magnetic recording medium of Example 1 can keep the formed magnetic bit more stably.

As described above, in the magnetic recording medium of Example 1, the Al underlayer was used, so that the performance of the magnetic recording medium was improved compared with the magnetic recording medium of Comparative Example 1.

Further, each of (i) the magnetic recording medium of Example 1 and (ii) the magnetic recording medium of Comparative Example 2 included the underlayer made of nonmagnetic metal element, but in the magnetic recording medium of Example 1 in which the Al film was used as the underlayer 3, its performance, particularly its recording frequency property (recording density) was improved compared with the magnetic recording medium of Comparative Example 2 in which the silver film was used.

Thus, it was proved that: by using Al as the underlayer, it was possible to easily form the bumps on the surface of the magnetic recording medium, thereby stably forming the recording bit. Note that, in the magnetic recording medium in which the Al underlayer was provided, the diameter of the bump formed on the surface of the magnetic recording medium was varied to check the respective recording properties based on the thermal assist. As a result, when the diameter of the bump was 10 to 50 nm, that is, when the density of the bumps was 400 bumps/μm$^2$ to 10000 bumps/μm$^2$, a great effect was obtained in improving the recording density of the magnetic recording medium.

Further, also in a case of using a Zn layer or a Mg layer as the underlayer, it is possible to obtain the same effect as in the case of using the Al layer as the underlayer.

EXAMPLE 5

The following sample was manufactured without performing the thermal assist so as to confirm the effect of the bumps formed on the surface of the amorphous magnetic layer also in a general magnetic recording/reproduction system for recording and reproducing information at a room temperature.

In terms of a structure and a manufacturing method, a magnetic recording medium of the present example was arranged in basically the same manner as the magnetic recording medium 1 of Example 2, and included a substrate 2, an underlayer 3 made of Al, an amorphous magnetic layer (magnetic layer) 4 made of TbFeCo, a protective layer 5 made of carbon, and a lubricating layer 6, wherein bumps were formed on a surface of the amorphous magnetic layer 4 and a surface of the magnetic recording medium. However, the magnetic recording medium of the present example was different from the magnetic recording medium of Example 1 in that: an amount of Tb of the amorphous magnetic layer 4 was adjusted so that it was possible to record and reproduce information at a room temperature. That is, the magnetic recording medium of the present example was arranged so that: the amount of Tb of the amorphous magnetic layer 4 was increased so as to reduce the coercive force at a room temperature and increase the magnetization at a room temperature, thereby realizing the recording and reproduction at a room temperature.

In the present example, there were manufactured three types of magnetic recording media each of which had the underlayer 3 made of Al, and they were different from each other in terms of the diameter of the bump formed on the surface of each magnetic recording medium (i.e., diameter of the bump formed on the surface of the amorphous magnetic layer 4) so that their diameters were 10 nm, 20 nm, and 30 nm. Further, there was manufactured a compared magnetic recording medium (having no underlayer) arranged in the same manner as the foregoing three magnetic recording media except that the underlayer was not provided.

Figure 10:
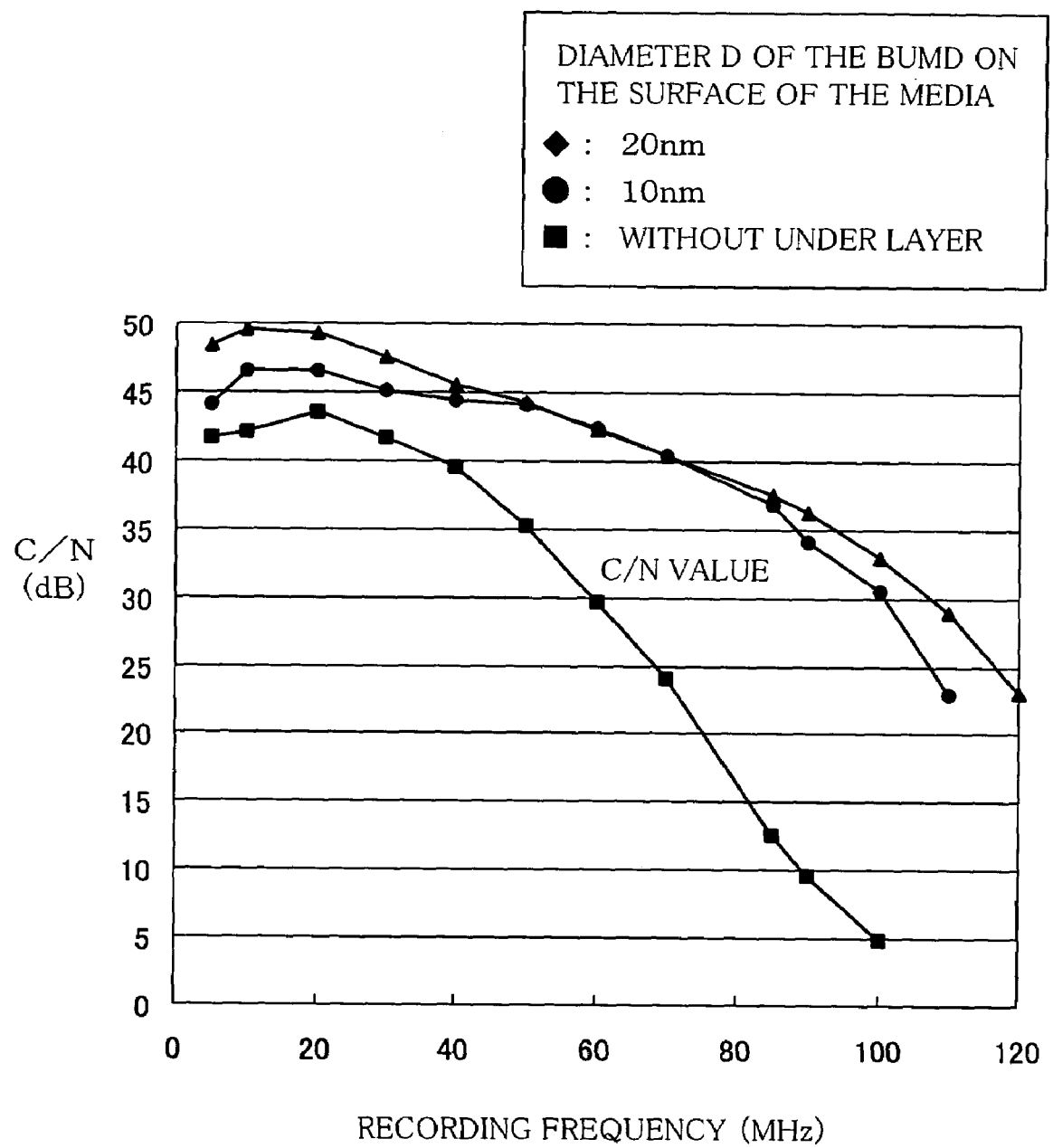
FIG. 10 is a graph showing recording frequency properties of the magnetic recording media of Example and Comparative Examples of the present invention.

The recording and reproduction were performed with respect to these four magnetic recording media, and their recording/reproduction properties were evaluated. Only the magnetic head was used without performing laser emission (thermal assist), as in a general magnetic recording medium, so as to perform the recording and reproduction of information. FIG. 10 shows results of the recording and reproduction of information.

As apparent from a graph shown in FIG. 10, the frequency property of the magnetic recording medium, according to the present invention, which included the bumps on the surface of the amorphous magnetic layer 4 was apparently improved compared with the compared magnetic recording medium having no underlayer, and it was confirmed that information could be recorded in a high-density manner. Under such condition that C/N is not less than 30 dB, when measurement was performed with respect to the compared magnetic recording medium, the recording frequency was not more than 60 MHz, but when the measurement was performed with respect to (i) the magnetic recording medium, according to the present invention, whose bump had a diameter of 10 nm (density of the bumps was 10000 bumps/$\mu m^2$) and (ii) the magnetic recording medium, according to the present invention, whose bump had a diameter of 20 nm (density of the bumps was 25000 bumps/$\mu m^2$), a recording frequency exceeding 100 MHz was realized. However, in the case of performing the recording at a room temperature, it is impossible to reduce the track width unlike the thermal assist recording.

While, in the magnetic recording medium whose bump had a diameter of 30 nm (density of the bumps is 1111 bumps/$\mu m^2$), the frequency property was improved compared with the compared magnetic recording medium having no underlayer, but the magnetic property of the magnetic recording medium showed an in-plane anisotropy which results in a problem of thermal fluctuation. Thus, it was proved that: in general magnetic recording in which the thermal assist was not performed, a magnetic recording medium whose bump had a diameter of not less than 30 nm was not so suitable for the high-density recording. Thus, it was proved that: in the general magnetic recording in which the thermal assist was not performed, by forming the magnetic recording medium so that the diameter of the bump formed on the surface of the amorphous magnetic layer 4 was less than 30 nm (density of the bumps was 2500 bumps/$\mu m^2$ to 10000 bumps/$\mu m^2$), it was possible to realize the high-density recording, and by forming the magnetic recording medium so that a diameter D of the bump formed on the surface of the amorphous magnetic layer 4 was less than 10 to 20 nm (density of the bumps was 2500 bumps/$\mu m^2$ to 10000 bumps/$\mu m^2$), it was possible to realize more preferable high-density recording.

EXAMPLE 6

In Examples 1 to 5 and Comparative Example 2, differences occurred in (i) the surface shape of the magnetic layer and (ii) the recording density, depending on differences in materials for the underlayer. The following description will explain causes thereof by using FIG. 12 and FIG. 13.

Figure 12:
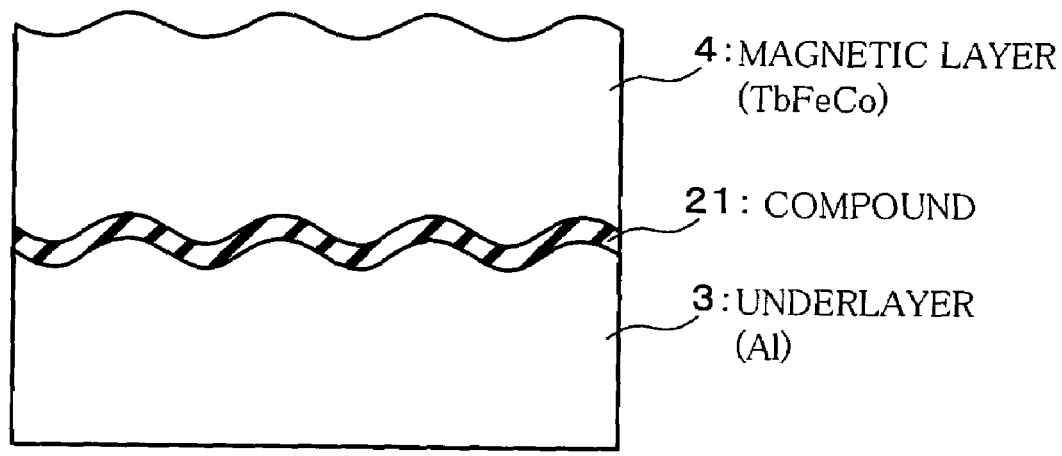
FIG. 12 is a schematic showing a shape of an interface between the magnetic layer and the underlayer of the magnetic recording medium according to one example of the present invention.

FIG. 12 is a schematic showing a case where TbFeCo is used as a material for the magnetic layer 4 and Al is used as a material for the underlayer 3 like Example 1 (bumps appear on the surface of the magnetic layer 4). In accordance with sputtering, elements Tb, Fe, and Co are made to adhere to the minute bumps of the underlayer 3 which is made of Al, so that the element Tb, Fe, and Co react with Al (underlayer 3). As a result, a compound 21 is formed along the bumps of the underlayer 3 as shown in FIG. 12. The compound 21 is an alloy such as AlFe and AlCo for example. A composition ratio of the compound 21 (alloy) is fixed. Thus, the reaction stops after an extremely thin layer of the compound 21 is formed, and a shape of the underlayer is fixed. Tb, Fe, and Co that are sputtered thereafter are deposited in accordance with the shape of the underlayer 3. As a result, bumps having the same shape as in the underlayer 3 appear on the surface of the magnetic layer 4.

Figure 13:
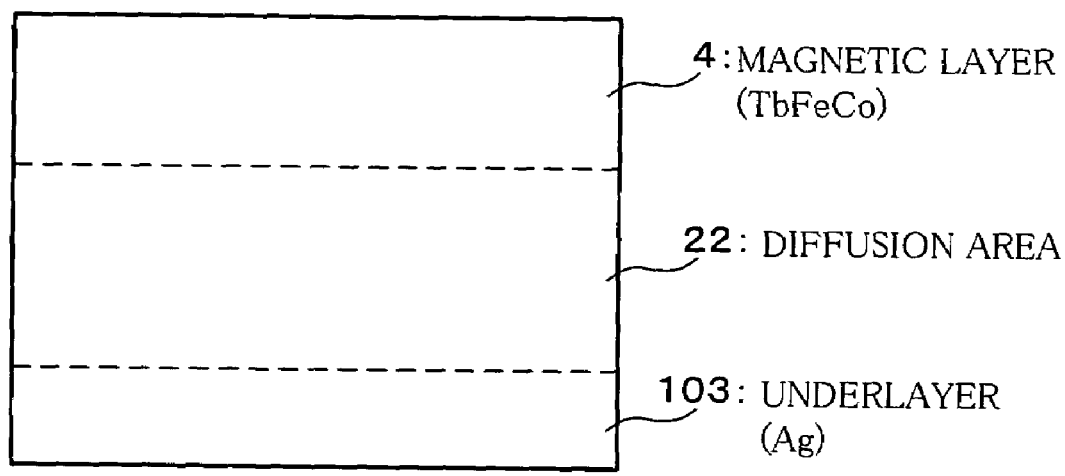
FIG. 13 is a schematic showing a shape of an interface between a magnetic layer and an underlayer of a compared magnetic recording medium.

However, in a case where an underlayer 103 made of Ag is used instead of the underlayer 3 made of Al (bumps do not appear on the surface of the magnetic layer 4) like Comparative Example 2, even if main elements Fe and Co constituting the magnetic layer 4 are made to adhere to the minute bumps of the underlayer 103 which are made of Ag in accordance with sputtering as shown in FIG. 13, Ag does not bring about the compound 21 in combination with Fe and Co, so that the elements are diffused from each other. As a result, the underlayer 103 gets out of shape, so that a diffusion area 22 in which TbFeCo and Ag are mixed is newly formed. Further, the diffusion area 22 spreads over the TbFeCo layer (magnetic layer 4) and the Ag layer (underlayer 103). This may cause the bumps to disappear.

That is, even though the underlayer has the bumps, unless the nonmagnetic metal element constituting the underlayer (3 or 103) and the element constituting the magnetic layer react with each other so as to form the compound 21, the bumps are not formed on the surface of the magnetic layer 4, so that it is impossible to largely improve the recording density.

Further, even in the case where the elements react with each other so as to form a compound as described above, it is more preferable that affinity between the nonmagnetic metal element constituting the underlayer 3 and the element constituting the magnetic layer 4 is greater. That is, when the affinity is great, it is easy to form the compound 21, so that the minute bumps are clearly formed on the surface of the magnetic layer 4.

There are many examples of the nonmagnetic metal element which constitutes the compound 21 (alloy) in combination with the element constituting the magnetic layer 4. However, in order that the underlayer 3 made of nonmagnetic metal element has an appropriate shape of bumps, it is possible to use Al, Zn, Mg, Ca, Sr, Ba, Pb, As, Ab, Te, and the like for example. Examples of a metal from which it is easy to form the compound 21 (alloy) having the great affinity with Fe include Zn and Al. Particularly, Al has great affinity with Fe. Thus, in the case where the magnetic layer 4 is made mainly of Fe, it is preferable to use Zn and Al as materials for the underlayer 3, and it is most preferable to use Al.

As described above, the magnetic recording medium of the present invention is arranged so that the magnetic layer has bumps on a surface thereof or the magnetic recording medium has bumps on a surface on the side of the magnetic layer, wherein density of the bumps is 400 bumps/$\mu m^2$.

According to the arrangement, the magnetic recording medium is formed so that minute bumps are formed on a surface of the magnetic layer or on a surface of the magnetic recording medium so as to be positioned on the side of the magnetic layer, so that it is possible to stably form a recording bit on the magnetic layer made of amorphous magnetic material. As a result, also in the case of performing the high-density recording, the arrangement gives the sufficient signal quality.

Further, as described above, the magnetic recording medium of the present invention is arranged so that the magnetic layer has bumps on a surface thereof or the magnetic recording medium has bumps on a surface on the side of the magnetic layer, wherein height of the bumps is not less than 2% with respect to an average layer thickness of the magnetic layer.

When a ratio of the bumps with respect to the layer thickness of the magnetic layer of the magnetic recording medium is small, the pinning effect caused by the bumps is reduced. However, according to the aforementioned arrangement, it is possible to exhibit the great effect in suppressing the magnetic wall movement in whole the magnetic layer. As a result, the aforementioned arrangement realizes such an effect that it is possible to obtain the sufficient signal quality also in performing the high-density recording.

It is preferable that the height of the bumps is not more than 20% with respect to the average layer thickness of the magnetic layer. When the height of the bumps is more than 20% with respect to the average layer thickness of the magnetic layer, noise is increased, which may deteriorate the recording/reproduction property.

The magnetic recording medium of the present invention has a structure based on any one of the following arrangements: (1) other layers, for example, a protective layer and a lubricating layer each of which protects the magnetic layer is formed on and above the magnetic layer, and an outermost layer includes bumps having the same shape as the bumps of the magnetic layer; (2) no other layer is formed on the magnetic layer, and the magnetic layer is exposed; and (3) other layers, for example, a protective layer and a lubricating layer each of which protects the magnetic layer is formed on and above the magnetic layer, and an outermost layer includes bumps having the same shape as the bumps of the magnetic layer, or the magnetic layer has a flat surface.

Further, it is preferable to arrange the magnetic recording medium of the present invention so that the bumps on the surface of the magnetic layer are formed by providing an underlayer, made of nonmagnetic metal element, between the substrate and the magnetic layer.

According to the arrangement, the bumps on the surface of the magnetic layer or the surface of the magnetic recording medium is formed by providing the nonmagnetic metal element between the substrate and the magnetic layer as the base element. Thus, it is easy to form the bumps on the surface of the magnetic layer or the magnetic recording medium so that the density of the bumps is 400 bumps/$\mu m^2$ to several thousands/$\mu m^2$ or more, or so that the height of the bumps is not less than 2% with respect to the average layer thickness of the magnetic layer. Such bumps on the surface of the magnetic layer or the surface of the magnetic recording medium are not seen in a recording medium having no underlayer, and are not seen also in a recording medium which has aluminium nitride, used in a conventional thermal assist magnetic recording medium, as the underlayer.

Note that, in the present specification, "nonmagnetic metal element" means not only a nonmagnetic metal simple substance but also a nonmagnetic alloy.

Further, it is preferable that the nonmagnetic metal element is aluminium.

According to the arrangement, an aluminium film is formed between the substrate and the magnetic layer, so that it is possible to form the bumps, whose density is appropriate (not less than 400 bumps/$\mu m^2$) and whose size is also appropriate, on the surface of the magnetic layer. For example, when the layer thickness of the magnetic layer is 50 nm, the average film thickness of the aluminium film is set to 1 to 6 nm, and the magnetic layer is formed thereon, and if necessary, the protective layer and the lubricating layer are formed sequentially, so that the bumps whose diameter ranges from 10 to 50 nm are formed on the surface of the magnetic layer. At this time, the density of the bumps ranges from 400 bumps/$\mu m^2$ to 10000 bumps/$\mu m^2$. Further, at this time, the height of the bumps formed on the surface of the magnetic layer is not less than 2% and not more than 8% with respect to the average layer thickness of the magnetic layer.

As described above, by using aluminium as the underlayer, it is possible to easily obtain the magnetic recording medium having the magnetic layer whose surface is provided with a most appropriate bumps, so that it is possible to obtain the sufficient signal quality also in the case of performing the high-density recording. Note that, it is possible to easily control the size of the bumps formed on the surface of the magnetic recording medium depending on a manufacturing condition such as a film thickness of Al.

Further, the aluminium film has a higher melting point (660° C.) than a low-melting metal, and has sufficient heat resistance, so that a shape of the aluminium film is not varied by rise of temperature which occurs in performing the thermal assist magnetic recording.

Further, it is preferable that the magnetic recording medium of the present invention has a coercive force which is not more than 1.5 times stronger than that of a magnetic recording medium having the same structure except that the underlayer is not provided.

According to the arrangement, due to the pinning effect of the bumps formed on the surface of the magnetic layer, the coercive force of the magnetic recording medium is not less than 1.5 times stronger than that of the magnetic recording medium which does not have the bumps on the magnetic layer, so that it is possible to keep the magnetic bit stably.

Further, it is preferable that the magnetic recording medium of the present invention has a magnetic compensation temperature of not less than 25° C.

Thus, it is possible to provide a magnetic recording medium, having high thermal stability, which is suitable for the thermal assist magnetic recording.

In order to realize the magnetic recording medium having the magnetic compensation temperature of not less than 25° C., the magnetic layer is designed so as to correspond to the underlayer.

Note that, in the present invention, "magnetic compensation temperature" means a temperature, less than Curie temperature, at which apparent magnetization is substantially 0.

Further, the magnetic recording medium of the present invention is preferably arranged so that the magnetic layer magnetically records information by receiving heat and a magnetic field.

The pinning effect obtained by forming the bumps on the surface of the magnetic layer is outstanding in the case where the magnetic layer magnetically records information by receiving heat and a magnetic field. This is based on the following cause. In the case of storing information by receiving heat and a magnetic field, the recording region is heated in recording information, so that its coercive force drops and its magnetic anisotropy largely drops. Thus, the magnetic wall movement tends to occur, so that it is more important to suppress the magnetic wall movement. As described above, in the magnetic recording medium for magnetically storing information by receiving heat and a magnetic field, the magnetic wall movement tends to occur, so that it is possible to obtain more outstanding effect by providing the bumps, which improves the signal quality in performing the high-density recording, on the magnetic layer.

The magnetic recording medium of the present invention is preferably arranged so that: the underlayer has bumps on a surface thereof, and a compound, made of (i) an element constituting the amorphous magnetic material and (ii) the nonmagnetic metal element, is formed between the magnetic layer and the underlayer.

In this manner, the compound, made of (i) an element constituting the amorphous magnetic material and (ii) the nonmagnetic metal element, which is a stable material, is formed between the magnetic layer and the underlayer, so that mutual diffusion between the magnetic layer and the underlayer is suppressed. Thus, a shape of the underlayer is fixed, so that the bumps formed on the surface of the underlayer cause bumps having substantially the same shape to be formed on the surface of the magnetic layer. Further, in this case, the shape of the underlayer can sufficiently influence an outermost surface of the magnetic layer, so that the bumps having the sufficient density and height appear on the outermost surface of the magnetic layer. Thus, this enhances the pinning effect. That is, the shape of the bumps formed on the surface of the underlayer can influence the surface of the magnetic layer in an extensional manner, thereby enhancing the pinning effect. As a result, it is possible to provide the magnetic recording medium which enables the high-density recording.

On the other hand, in the case where the compound, made of (i) an element constituting the magnetic layer and (ii) the nonmagnetic metal element, is not formed between the magnetic layer and the underlayer, the nonmagnetic metal element constituting the underlayer and the element constituting the amorphous magnetic material are diffused from each other, so that the bumps formed on the surface of the underlayer do not cause bumps having substantially the same shape to be formed on the surface of the magnetic layer. Thus, the bumps, having the sufficient density and height, which correspond to the bumps formed on the underlayer, do not appear on the outermost surface of the magnetic layer, so that the pinning effect is not enhanced.

Note that, it is difficult to directly detect whether or not there is formed a compound made of (i) the element constituting the amorphous magnetic material and (ii) the nonmagnetic metal element, but by checking a state diagram (state graph), it is possible to judge whether or not combination of (i) the element constituting the amorphous magnetic material and (ii) the nonmagnetic metal element is combination which makes up the compound. Thus, when the combination of (i) the element constituting the amorphous magnetic material and (ii) the nonmagnetic metal element is judged as the combination which makes up the compound, it is possible to judge that the compound made of (i) the element constituting the amorphous magnetic material and (ii) the nonmagnetic metal element is formed between the magnetic layer and the underlayer.

Further, the magnetic recording medium arranged in the foregoing manner can be manufactured by forming the magnetic layer on the underlayer, for example, the magnetic recording medium can be manufactured in the same manner as in forming the compound by combining the nonmagnetic metal element with the element constituting the amorphous magnetic material. In this case, a stable compound is formed in an interface between the underlayer and the magnetic layer.

Further, the magnetic recording device of the present invention is to cause the aforementioned magnetic recording medium to magnetically record information on the magnetic layer, and includes magnetic field application means for applying a magnetic field, which determines a magnetization direction of the magnetic layer, to the magnetic layer.

According to the arrangement, by using the magnetic recording medium having the aforementioned characteristics, it is possible to provide the magnetic recording device which can perform the high-density recording with the sufficient signal quality.

Further, the magnetic recording device of the present invention is to cause the magnetic layer of the aforementioned magnetic recording medium to magnetically record information, and includes: heating means for locally heating the magnetic layer; and magnetic field application means for applying a magnetic field, which determines a magnetization direction of the magnetic layer, to at least one part of a heated region in the magnetic layer.

According to the arrangement, by using the magnetic recording medium having the aforementioned characteristics, it is possible to provide the magnetic recording device which can perform the high-density recording with the sufficient signal quality. Further, according to the arrangement, the thermal assist magnetic recording system is used, so that a region on which information is recorded is formed only at a region in which a light beam emission region and a magnetic field application region overlap with each other. Thus, it is possible to reduce the recording track width, and it is possible to record information in a high-density manner. Further, in the thermal assist magnetic recording system, the magnetic wall movement tends to occur, so that it is possible to further improve the signal quality in performing the high-density recording based on the bumps formed on the surface of the magnetic recording medium.

The magnetic recording medium of the present invention can be used as a high-density magnetic recording medium for storing video data, music data, and other various kinds of data in a high-density manner. Further, the magnetic recording device can be used as a magnetic recording device for causing the high-density magnetic recording medium to record video data, music data, and other various kinds of data in a high-density manner, for example, the magnetic recording medium can be used as a video recorder or an external recording device.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magnetic recording medium, comprising:
a substrate; and
a magnetic layer, made of amorphous magnetic material, for magnetically recording information,
wherein the magnetic layer has bumps on a surface thereof, and density of the bumps is not less than 400 bumps/$\mu m^2$, and
wherein at least five of the bumps are included in a single magnetic bit.

2. The magnetic recording medium as set forth in claim 1, wherein the bumps are formed by providing an underlayer, made of nonmagnetic metal element, between the substrate and the magnetic layer.

3. The magnetic recording medium as set forth in claim 2, wherein the nonmagnetic metal element is aluminum.

4. The magnetic recording medium as set forth in claim 2, wherein:
the underlayer has bumps on a surface thereof, and
a compound made of (i) an element constituting the amorphous magnetic material and (ii) the nonmagnetic metal element is formed between the magnetic layer and the underlayer.

5. The magnetic recording medium as set forth in claim 1, wherein a magnetic compensation temperature thereof is not less than 25° C.

6. The magnetic recording medium as set forth in claim 1, wherein the magnetic layer is to magnetically record the information by receiving heat and a magnetic field that are applied.

7. A magnetic recording medium, comprising:
a substrate; and
a magnetic layer, made of amorphous magnetic material, for magnetically recording information,
wherein the magnetic recording medium has bumps on a side of the magnetic layer, and density of the bumps is not less than 400 bumps/$\mu m^2$, and
wherein at least five of the bumps are included in a single magnetic bit.

8. The magnetic recording medium as set forth in claim 7, wherein the bumps are formed by providing an underlayer, made of nonmagnetic metal element, between the substrate and the magnetic layer.

9. The magnetic recording medium as set forth in claim 8, wherein the nonmagnetic metal element is aluminum.

10. The magnetic recording medium as set forth in claim 8, wherein:
the underlayer has bumps on a surface thereof, and
a compound made of (i) an element constituting the amorphous magnetic material and (ii) the nonmagnetic metal element is formed between the magnetic layer and the underlayer.

11. The magnetic recording medium as set forth in claim 7, wherein a magnetic compensation temperature thereof is not less than 25° C.

12. The magnetic recording medium as set forth in claim 7, wherein the magnetic layer is to magnetically recording the information by receiving heat and a magnetic field that are applied.

13. A magnetic recording device, for causing a magnetic layer of a magnetic recording medium to magnetically record information, said magnetic recording medium including: a substrate; and the magnetic layer, made of amorphous magnetic material, for magnetically recording the information, wherein:
the magnetic layer is made of amorphous magnetic material, and
the magnetic layer has bumps on a surface thereof, and density of the bumps is not less than 400 bumps/$\mu m^2$,
said magnetic recording device comprising magnetic field application means for applying a magnetic field, which determines a magnetization direction of the magnetic layer, to the magnetic layer, and
wherein at least five of the bumps are included in a single magnetic bit.

14. The magnetic recording device as set forth in claim 13, further comprising heating means for locally heating the magnetic layer, wherein the magnetic field application means is to apply the magnetic field, which determines the magnetization direction of the magnetic layer, to at least one part of a heated region in the magnetic layer, so that the magnetic layer magnetically records the information by receiving heat and a magnetic field that are applied.

15. A magnetic recording device, for causing a magnetic layer of a magnetic recording medium to magnetically record information, said magnetic recording medium including: a substrate; and the magnetic layer, made of amorphous magnetic material, for magnetically recording the information, wherein:
the magnetic layer is made of amorphous magnetic material, and
the magnetic recording medium has bumps on a side of the magnetic layer, and density of the bumps is not less than 400 bumps/$\mu m^2$, and
wherein at least five of the bumps and/or concaves are included in a single magnetic bit,
said magnetic recording device comprising magnetic field application means for applying a magnetic field, which determines a magnetization direction of the magnetic layer, to the magnetic layer.

16. The magnetic recording device as set forth in claim 15, further comprising heating means for locally heating the magnetic layer, wherein
the magnetic field application means applies the magnetic field, which determines the magnetization direction of the magnetic layer, to at least one part of a heated region in the magnetic layer, so that the magnetic layer magnetically records the information by receiving heat and a magnetic field that are applied.

17. A magnetic recording device, for causing a magnetic layer of a magnetic recording medium to magnetically record information, said magnetic recording medium including: a substrate; and the magnetic layer, made of amorphous magnetic material, for magnetically recording the information, wherein:
the magnetic layer is made of amorphous magnetic material, and
the magnetic layer has bumps on a surface thereof, and density of the bumps is not less than 400 bumps/$\mu m^2$, and
wherein at least five of the bumps and/or concaves are included in a single magnetic bit,
said magnetic recording device comprising a magnetic field generator for applying a magnetic field, which determines a magnetization direction of the magnetic layer, to the magnetic layer.

18. The magnetic recording device as set forth in claim 17, further comprising a heater for locally heating the magnetic layer, wherein the magnetic field generator applies the magnetic field, which determines the magnetization direction of the magnetic layer, to at least one part of a heated region in the magnetic layer, so that the magnetic layer magnetically records the information by receiving heat and a magnetic field that are applied.

19. A magnetic recording device, for causing a magnetic layer of a magnetic recording medium to magnetically record information, said magnetic recording medium including: a substrate; and the magnetic layer, made of amorphous magnetic material, for magnetically recording the information, wherein:

the magnetic layer is made of amorphous magnetic material, and the magnetic recording medium has bumps on a side of the magnetic layer, and density of the bumps is not less than 400 bumps/μm², and wherein at least five of the bumps and/or concaves are included in a single magnetic bit, said magnetic recording device comprising a magnetic field generator for applying a magnetic field, which determines a magnetization direction of the magnetic layer, to the magnetic layer.

20. The magnetic recording device as set forth in claim 19, further comprising a heater for locally heating the magnetic layer, wherein the magnetic field generator applies the magnetic field, which determines the magnetization direction of the magnetic layer, to at least one part of a heated region in the magnetic layer, so that the magnetic layer magnetically records the information by receiving heat and a magnetic field that are applied.

* * * * *